(12) United States Patent
Mann et al.

(10) Patent No.: US 8,059,174 B2
(45) Date of Patent: Nov. 15, 2011

(54) CMOS IMAGER SYSTEM WITH INTERLEAVED READOUT FOR PROVIDING AN IMAGE WITH INCREASED DYNAMIC RANGE

(75) Inventors: Richard A. Mann, Torrance, CA (US); Selim Bencuya, Irvine, CA (US); Jiafu Luo, Irvine, CA (US); Alexandre G. Grigoriev, Irvine, CA (US); Heng Zhang, Lake Forest, CA (US); Miaohong Shi, Irvine, CA (US); Robert Blair, Los Altos Hills, CA (US); Max Safai, San Juan Capistrano, CA (US)

(73) Assignee: ESS Technology, Inc., Fremont, CA (US)

( * ) Notice: Subject to any disclaimer, the term of this patent is extended or adjusted under 35 U.S.C. 154(b) by 470 days.

(21) Appl. No.: 11/521,883

(22) Filed: Sep. 15, 2006

(65) Prior Publication Data

US 2007/0285526 A1     Dec. 13, 2007

Related U.S. Application Data

(60) Provisional application No. 60/809,890, filed on May 31, 2006.

(51) Int. Cl.
*H04N 9/083* (2006.01)
*H04N 3/14* (2006.01)
*H04N 5/335* (2011.01)
*H04N 9/04* (2006.01)

(52) U.S. Cl. ..................................... 348/273; 348/222.1
(58) Field of Classification Search ................ 348/221.1, 348/273, 280, 297, 305, 320, 321, 322, 323, 348/222.1, 279
See application file for complete search history.

(56) References Cited

U.S. PATENT DOCUMENTS

| | | | | |
|---|---|---|---|---|
| 5,991,456 A | * | 11/1999 | Rahman et al. | 382/254 |
| 6,211,915 B1 | * | 4/2001 | Harada | 348/298 |
| 6,486,911 B1 | * | 11/2002 | Denyer et al. | 348/308 |
| 6,642,962 B1 | * | 11/2003 | Lin et al. | 348/252 |
| 6,825,884 B1 | * | 11/2004 | Horiuchi | 348/362 |
| 6,930,716 B2 | * | 8/2005 | Yoshida | 348/322 |
| 6,943,837 B1 | * | 9/2005 | Booth, Jr. | 348/297 |
| 6,987,536 B2 | * | 1/2006 | Olding et al. | 348/297 |
| 6,992,706 B2 | * | 1/2006 | Mabuchi et al. | 348/220.1 |

(Continued)

FOREIGN PATENT DOCUMENTS

CN     1413411 A     4/2003

(Continued)

*Primary Examiner* — Lin Ye
*Assistant Examiner* — Chriss Yoder, III
(74) *Attorney, Agent, or Firm* — Farjami & Farjami LLP

(57) ABSTRACT

There is provided a CMOS imager system for providing a viewable image having increased dynamic range including an image sensor including a number of sets of pixels. Each set of pixels is configured to receive one of a number of exposures and to generate image data corresponding to the received exposure in the interleaved mode. The image sensor is configured to operate in either an interleaved mode or a non-interleaved mode and to output the image data generated by each set of pixels as a frame of interleaved image data in the interleaved mode. The imager system further includes an interleaved image pipeline in communication with the image sensor, where the interleaved image pipeline is configured to receive the interleaved image data from the image sensor, combine the image data generated by each set of pixels corresponding to one of the exposures to form the viewable image.

51 Claims, 23 Drawing Sheets

U.S. PATENT DOCUMENTS

| | | | |
|---|---|---|---|
| 7,362,362 B2 * | 4/2008 | Talla et al. | 348/273 |
| 7,382,407 B2 * | 6/2008 | Cho et al. | 348/296 |
| 7,428,011 B1 * | 9/2008 | Hyodo et al. | 348/231.6 |
| 7,430,011 B2 * | 9/2008 | Xu et al. | 348/362 |
| 7,440,019 B2 * | 10/2008 | Suzuki et al. | 348/315 |
| 7,446,812 B2 * | 11/2008 | Ando et al. | 348/362 |
| 7,456,866 B2 * | 11/2008 | Hirose | 348/222.1 |
| 7,623,168 B2 * | 11/2009 | Gallagher et al. | 348/275 |
| 2002/0180875 A1 * | 12/2002 | Guidash | 348/280 |
| 2005/0140807 A1 * | 6/2005 | Nam | 348/311 |
| 2007/0242141 A1 * | 10/2007 | Ciurea | 348/239 |

FOREIGN PATENT DOCUMENTS

WO    WO 2006/049098    5/2006

* cited by examiner

| B Short | G1 Long | B Short | G1 Long | B Short | G1 Long |
|---|---|---|---|---|---|
| G2 Short | R Long | G2 Short | R Long | G2 Short | R Long |
| B Long | G1 Short | B Long | G1 Short | B Long | G1 Short |
| G2 Long | R Short | G2 Long | R Short | G2 Long | R Short |

202a → (row 1), 202b → (row 2), 202c → (row 3), 202d → (row 4)

| | | | | | | | |
|---|---|---|---|---|---|---|---|
| B Short | G1 Short | B Long | G1 Long | B Short | G1 Short | B Long | G1 Long |
| G2 Long | R Long | G2 Short | R Short | G2 Long | R Long | G2 Short | R Short |
| B Short | G1 Short | B Long | G1 Long | B Short | G1 Short | B Long | G1 Long |
| G2 Long | R Long | G2 Short | R Short | G2 Long | R Long | G2 Short | R Short |

302a → (row 1), 302b → (row 2), 302c → (row 3), 302d → (row 4)

FIG. 9A

| | | | | | | | |
|---|---|---|---|---|---|---|---|
| G1 Long | R Long | R Short | G1 Short | G1 Long | R Long | R Short | G1 Short |
| B Short | G2 Short | G2 Long | B Long | B Short | G2 Short | G2 Long | B Long |
| G1 Long | R Long | R Short | G1 Short | G1 Long | R Long | R Short | G1 Short |
| B Short | G2 Short | G2 Long | B Long | B Short | G2 Short | G2 Long | B Long |
| G1 Long | R Long | R Short | G1 Short | G1 Long | R Long | R Short | G1 Short |
| B Short | G2 Short | G2 Long | B Long | B Short | G2 Short | G2 Long | B Long |
| G1 Long | R Long | R Short | G1 Short | G1 Long | R Long | R Short | G1 Short |
| B Short | G2 Short | G2 Long | B Long | B Short | G2 Short | G2 Long | B Long |
| G1 Long | R Long | R Short | G1 Short | G1 Long | R Long | R Short | G1 Short |
| B Short | G2 Long | G2 Long | B Long | B Short | G2 Short | G2 Long | B Long |

CMOS IMAGER SYSTEM WITH INTERLEAVED READOUT FOR PROVIDING AN IMAGE WITH INCREASED DYNAMIC RANGE

RELATED APPLICATIONS

The present application claims the benefit of U.S. provisional application Ser. No. 60/809,890, filed May 31, 2006, which is hereby fully incorporated by reference in the present application.

BACKGROUND OF THE INVENTION

1. Field of the Invention

The present invention is generally in the field of digital image processing. More specifically, the present invention is in the field of CMOS imager systems for digital image capture and image processing.

2. Related Art

Mobile imaging devices, such as cell phone cameras, require very small size cameras to capture a target scene and output an image that corresponds to the target scene. As pixel resolution is increased and camera size is held constant or reduced in mobile imaging devices, the pixel size for imagers, such as complementary metal oxide semiconductor (CMOS) imagers, in the cameras is reduced. As a result of pixel size reduction, the dynamic range of the image provided by the CMOS imager is also reduced, which can cause degradation of outdoor image quality.

In one conventional approach, the dynamic range of the image provide by the CMOS imager can be increased by combining two or more independent frames together, where each frame is produced at a different exposure. For example, a first frame can be produced at a first exposure and stored in a frame buffer. A second frame, which is produced at a second exposure, can then be combined with the first frame in real time by utilizing a digital process. However, this approach requires the storage of one full frame of data in a frame buffer prior to processing the second frame, which significantly increases the cost of the camera system.

The dynamic range of the image provided by the CMOS imager could also be increased by utilizing larger pixels with increased capacity. However, increasing pixel size undesirably increases the manufacturing cost of the imager and, consequently, the cost of the cell phone camera or other mobile imaging device in which the imager resides. In addition, the physical size limits of portable electronic devices often do not allow an increase in the size of the camera which must accompany the use of a larger pixel element.

Thus, there is a need in the art for a small, cost-effective camera system, such as a CMOS imager with small pixel, that can provide an image having increased dynamic range.

SUMMARY OF THE INVENTION

The present invention is directed to CMOS imager system with interleaved readout for providing an image with increased dynamic range. More specifically, the invention provides a cost-effective CMOS imager system with an image sensor having an interleaved readout for providing a viewable image with increased dynamic range. The invention also provides a CMOS imager system that provides an increased dynamic range image with reduced motion artifacts and reduced latency compared to a conventional CMOS imager system that uses information from multiple successive frames.

In one aspect, an imager system, such as a CMOS imager system, for providing a viewable image having increased dynamic range includes an image sensor including a number of sets of pixels. The image sensor is configured to operate in either an interleaved mode or a non-interleaved mode. Each set of pixels is configured to receive one of a number of exposures and to generate image data corresponding to the received exposure in the interleaved mode. Each set of pixels can be further configured to receive a same exposure and to generate image data corresponding to the same exposure in the non-interleaved mode and the image sensor can be further configured to output the image data corresponding to the same exposure as a frame of non-interleaved image data in the non-interleaved mode. For example, the number of sets of pixels can be two sets of pixels, where the two sets of pixels are interleaved in a ½ line Bayer interleave pattern or interleaved in a zig-zag Bayer interleave pattern. The image sensor is further configured to output the image data generated by each set of pixels as a frame of interleaved image data in the interleaved mode.

The imager system further includes an interleaved image pipeline in communication with the image sensor, where the interleaved image pipeline is configured to receive the interleaved image data from the image sensor, combine the image data generated by each set of pixels corresponding to one of the exposures to form the viewable image with increased dynamic range, and output the viewable image. The interleaved image pipeline combines the information from the multiple exposures to form an image with expanded dynamic range or wide dynamic range (WDR). For example, the interleaved image pipeline and the image sensor can be situated on separate semiconductor dies or situated on the same semiconductor die. The viewable image can be an RGB image. The interleaved image pipeline can be further configured to receive the interleaved image data from the image sensor and combine the image data generated by each set of pixels corresponding to one of the exposures without using a frame buffer.

An additional benefit of the interleaved CMOS wide dynamic range imager system is the reduction of motion artifacts since a single frame contains information from two or more exposures which are executed in the shortest possible time. The invention's CMOS imager system provides a further benefit of forming the increased dynamic range image with minimal latency through pipeline processing of the image data. In contrast, conventional CMOS imager systems using two or more frames can require a significant delay before the final image is formed in post processing from one or more stored frames.

These and other aspects of the present invention will become apparent with further reference to the drawings and specification, which follow. It is intended that all such additional systems, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 9A illustrates a diagram of an exposure pattern for a pixel array according to one embodiment of the present invention;

FIG. 9B illustrates a diagram of exposure data interpolation for a pixel in the exposure pattern in FIG. 9A;

DETAILED DESCRIPTION OF THE INVENTION

Figure 1:
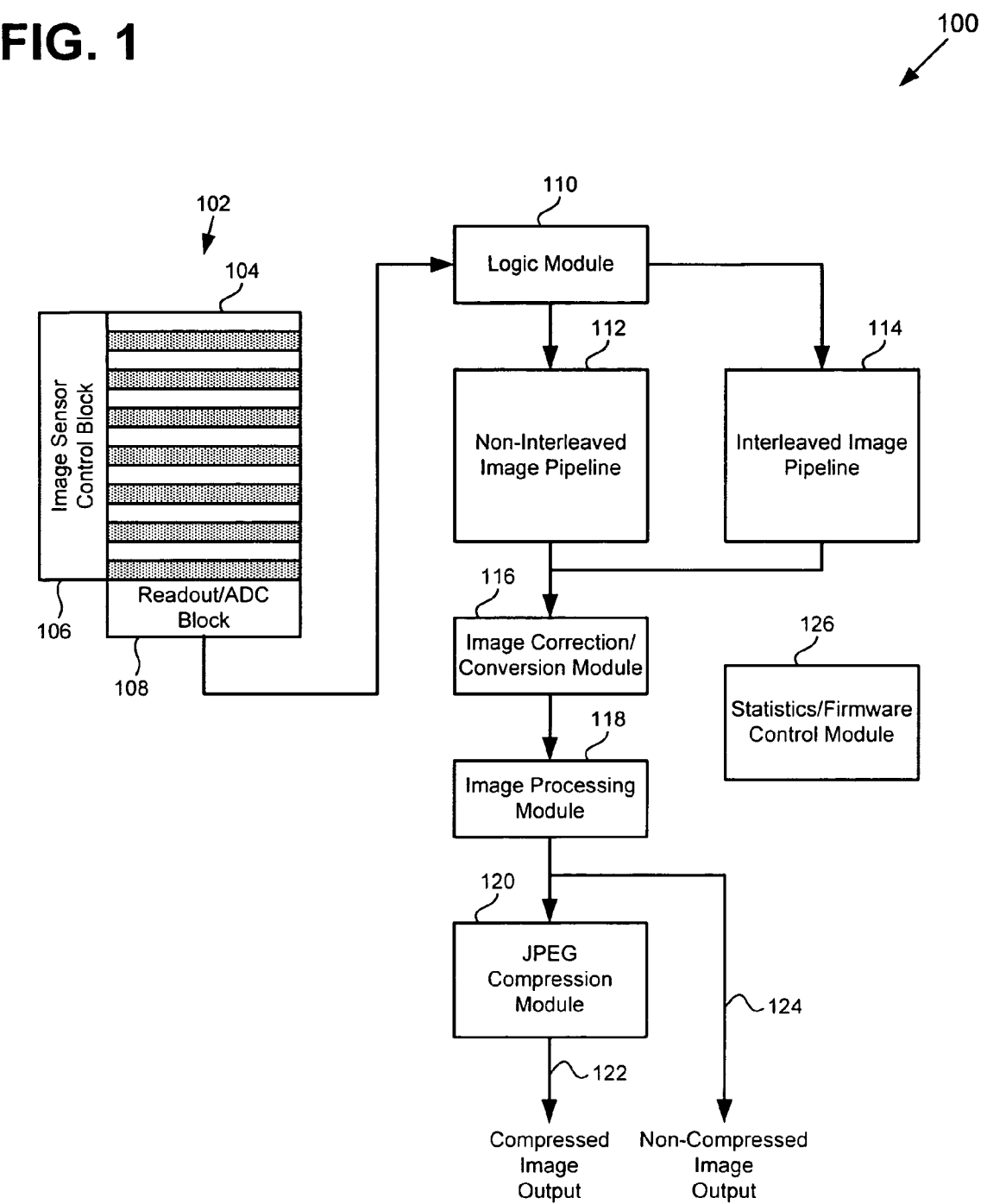
FIG. 1 illustrates a diagram of an imager system according to one embodiment of the present invention.

The present invention is directed to CMOS imager system with interleaved readout for providing an image with increased dynamic range. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

The present invention achieves a viewable image having increased dynamic range by configuring a CMOS sensor to output image data from multiple sets of pixels, where each set of pixels receives a different exposure. In the present invention, the image data from each exposure is combined in an interleaved image pipeline to form a frame (i.e. a viewable image) having expanded dynamic range. As will be discussed in detail below, the invention advantageously achieves a CMOS imager system that provides a frame having expanded dynamic range by combining image data generated at different exposures without requiring a frame buffer. In addition the image information from the multiple exposures is collected with a minimum of offset in time between the exposure sets which will constitute the final image. This approach reduces motion artifacts which can be present when information is combined from two independent frames with different exposures through the use of a frame buffer.

FIG. 1 shows a diagram of an example imager system, according to one embodiment of the present invention. Imager system 100, which can be a CMOS imager system, includes image sensor 102, logic module 110, non-interleaved image pipeline 112, interleaved image pipeline 114, image correction/conversion module 116, image processing module 118, JPEG compression module 120, compressed image output 122, non-compressed image output 124, and statistics/firmware control module 126. Image sensor 102, which can be a CMOS image sensor, includes sensor array 104, image sensor control block 106, and readout/ADC block 108. Imager system 100 can be fabricated on one semiconductor die. In one embodiment, imager system 100 can be fabricated on two semiconductor dies. In such instance, image sensor 102 can be fabricated on one semiconductor die and other components of image system 100, such as interleaved image pipeline 114, can be fabricated on another semiconductor die, for example.

Image sensor 102 includes sensor array 104, which includes an array of pixels arranged in rows and columns, where each pixel comprises a photodiode for capturing incident light from a target scene. In the present embodiment, sensor array 104 further includes an overlying arrangement of color filters (i.e. blue, red, and green filters) in a Bayer pattern such that sensor array 104 generates a Bayer pattern raw image that corresponds to the target scene. The Bayer pattern raw image forms a pixel array that includes a repeating quad pattern comprising a blue pixel and a green pixel situated over a green pixel and a red pixel. In other embodiments, other arrangements of color filters can be used in place of a Bayer pattern, such as an arrangement of color filters comprising cyan, yellow, and magenta. The arrangement of the color filter elements and the exposure sets should be optimized to maximize the effective resolution of the final expanded dynamic range image. Several alternative arrangements of pixels with respect to color filters and exposure sets are described in this invention.

Image sensor 102 can be configured to operate in either an interleaved mode or a non-interleaved mode. In the interleaved mode, image sensor 102 can output a frame of interleaved image data that includes image data generated by each of multiple sets of pixels (i.e. two or more sets of pixels), where each set of pixels receives a different exposure, and where the multiple sets of pixels are read out in the same frame. In the non-interleaved mode, image sensor 102 can output a frame of non-interleaved data that includes image data generated by each of multiple sets of pixels, where each set of pixels receives the same exposure, and where the multiple sets of pixels are read out in the same frame. In the interleaved mode, the output of image sensor 102 can be referred to as "an interleaved readout" and in the non-interleaved mode the output of image sensor 102 can be referred to as "a progressive readout." In the present application, an "interleaved readout" refers to the capability to capture exposure data from multiple sets of pixels, where each of the sets of pixels has a different exposure, and where the multiple sets of pixels are read out in the same frame. In the present application, a "progressive readout" refers to the capability to capture exposure data by multiple sets of pixels, where each of the sets of pixels has the same exposure, and where the multiple sets of pixels are read out in the same frame.

Thus, image sensor 102 can provide either an interleaved readout or a progressive readout. Image sensor 102 can also be configured to switch from operating in an interleaved mode (i.e. outputting interleaved image data) to operating in a non-interleaved mode (i.e. outputting non-interleaved image data) and vice versa. The image data that is outputted by image sensor 102 when all of the pixels in sensor array 104 (i.e. all sets of pixels in sensor array 104) receive the same exposure (i.e. a non-interleaved mode of operation of image sensor 102) is also referred to as "non-interleaved image data." It is noted that interleaved image data and non-interleaved image data each comprise raw data, which is not in a viewable format (e.g. raw data from the color pattern must first be interpolated to provide color information at all pixel locations using the information provided to be viewed on a monitor or video display device).

In the interleaved mode, image sensor 102 can be configured to output image data provided by one set of pixels at a first exposure and output image data provided by another set of pixels at a second exposure, where the first exposure is different in duration compared to the second exposure, and where the first and second exposures occur in the same frame. The interleaved exposures are achieved by resetting or restarting the exposure on a set or set of pixels while exposure continues to accrue on alternate sets of pixels. All sets of pixels complete exposure at the same relative timing of the rolling shutter and are thereby read out in a single frame. For example, odd rows of pixels in sensor array 104 can receive a first exposure and even rows of pixels in sensor array 104 can receive a second exposure, where the first exposure is shorter in duration than the second exposure, and where image sensor 102 outputs interleaved image data comprising image data from the odd rows of pixels, which receive the first exposure, and image data from the even rows of pixels, which receive the second exposure.

The assignment of exposures to sets of pixels is preferably done to provide equal density of information in each pixel color and to maximize the perceived detail and sharpness of the final wide dynamic range image. In one embodiment, image sensor 102 can be configured to output interleaved image data from two sets of pixels that are interleaved in a ½ line Bayer interleave pattern (discussed below in relation to FIGS. 2A and 2B), where each set of pixels receives a different exposure. Within each set receiving the same exposure are an equal number of green, blue and red pixels in this example. In one embodiment, image sensor 102 can be configured to output interleaved image data from two sets of pixels that are interleaved in a zig-zag interleave pattern (discussed below in relation to FIGS. 3A and 3B), where each set of pixels receives a different exposure. In other embodiments, image sensor 102 can be configured to output interleaved image data from sets of pixels that are interleaved in other configurations. In other embodiments, an image sensor, such as image sensor 102, can be configured to output interleaved image data provided by more than two sets of pixels, where each set of pixels receives an exposure that is different in duration than the exposures received by the other sets of pixels.

Image sensor control block 106 in image sensor 102 can be configured to control the exposure durations of pixel rows and/or portions of pixel rows in sensor array 104. Readout/ADC block 108 in image sensor 102 can control the readout of sensor array 104 and provide analog-to-digital conversion of the data stream outputted by sensor array 104. Readout/ADC block 108 can output non-interleaved image data when sensor array 104 is configured such that all pixels or sets of pixels receive the same exposure and can output interleaved image data when sensor array 104 is configured such that multiple sets of pixels each receive a different exposure. Readout/ADC block 108 can output either non-interleaved image data or interleaved image data as 10-bit raw data. Image sensor 102 can also include a black level adjustment block (not shown in FIG. 1) for adjusting the black level of the image data outputted by readout/ADC block 108.

Imager system 100 can also include digital correction circuits (not shown in FIG. 1) for providing black level correction, column and row noise removal, bad pixel correction, and digital gain control of the image data outputted by readout/ADC block 108. As shown in FIG. 1, the output of readout/ADC block 108, which is also the output of image sensor 102, is coupled to logic module 110, which can be configured to determine whether the image data outputted by readout/ADC block 108 of image sensor 102 is interleaved image data (i.e. image data outputted by multiple sets of pixels, where each set of pixels receives a different exposure) or non-interleaved image data (i.e. image data outputted by sets of pixels, where each set of pixels receives the same exposure). Logic module 110 can be further configured to provide interleaved image data to interleaved image pipeline 114 if the interleaved image data is inputted into logic module 110 and to provide non-interleaved image data to non-interleaved image pipeline 112 if the non-interleaved image data is inputted into logic module 110.

Non-interleaved image pipeline 112 can be configured to receive non-interleaved image data from image sensor 102 via logic module 110, convert the non-interleaved image data into a frame of RGB data by utilizing a Bayer pattern interpolation process as is known in the art, and output a frame of RGB data corresponding to the non-interleaved image data. Interleaved image pipeline 114 can be configured to receive interleaved image data outputted by image sensor 102 via logic module 110, where the interleaved image data includes image data outputted by multiple sets of pixels, and where each set of pixels receives a different exposure, and combine the image data outputted by each set of pixels that receives a different exposure to form a single frame (i.e. a viewable image) comprising RGB data. Thus, the frame formed by interleaved image pipeline 114 comprises a frame that includes red, green, and blue (i.e. RGB) data at each pixel location. Interleaved pipeline 114 can be further configured to output the viewable image to image correction/conversion module 116. By forming the viewable image from a frame of interleaved image data that includes image data generated by multiple sets of pixels, where each set of pixels receives a different exposure, the viewable image has increased dynamic range.

There exists a significant body of knowledge in the public domain on algorithms for combining two full frames of information into a single image, where each full frame has a separate exposure. The Interleaved pipeline accomplishes a similar function without the frame buffer by using interpolation methods to provide a complete set of information at each location. The wide dynamic range frame that is formed by interleaved pipeline 114 can be formed, for example, by storing only a few lines of image data which will contain information from both the short and the long exposures in all needed colors. A wide dynamic range image can be "interpolated" in a manner very similar to well known methods which use two full frames. For example, between four and six lines of physical image data can be stored in the image pipeline. The number of lines needed will depend upon the details of the Pixel interleave pattern selected and the interpolation algorithm. At each location the missing information is created by interpolation and stored temporarily in a small amount of working memory. For example, at a location which captured a green short exposure a best value for missing green long exposure data can be formed. A wide dynamic range image formation algorithm can then be used as if a full frame of data had been collected for this pixel location. Interleaved image pipeline 114 can be further configured to select which interleaved image data to combine to form the frame comprising the viewable image and how to combine the interleaved image data in real time.

When image sensor 102 is outputting non-interleaved image data (i.e. operating in a non-interleaved mode), substantially no information is lost in the frame. However, when image sensor 102 is outputting interleaved image data (i.e. operating in an interleaved mode), information can be lost in some areas of the frame as a result of multiple exposures. For example, in a highlighted area (i.e. a very bright area) of a target scene, a set of pixels that receives a longer exposure can be saturated such that substantially all information is lost. In this area (i.e. the highlighted area), the valid information corresponding to the target scene may only be present in the set of pixels receiving the shorter exposure. Interleaved image pipeline 114 can recognize this condition and interpolate the highlighted area of the frame from only the set of pixels receiving the shorter exposure. In areas of the image in which valid information is present in both exposures, interleaved image pipeline 114 can form a suitable weighted average to provide local details of the target scene. Interleaved image pipeline 114 can be further configured to sharpen the color image in the frame (i.e. the viewable image) by, for example, finding edges based upon the rate of change of the interleaved image data and making the edges appear more abrupt through mathematical manipulation of the interleaved image data.

Image pipeline 114 can also be utilized to collect statistics relating to interleaved image data that flows through the interleaved image pipeline in real time. The statistics, such as standard deviation and population of events, can be placed into a histogram. A controller in the invention's imager system can select a different exposure or different exposures for a corresponding set or sets of pixels in the image sensor based on data in the histogram. Thus, for example, if the controller determines that an image is too dark based on the histogram, the controller can alter one or more exposures to lighten the image. The controller can be situated, for example, in the statistics/firmware control module (e.g. statistics/firmware control module 126) in the imager system.

In the present embodiment, by forming a frame by combining image data generated by each of two sets of pixels, which each set of pixels receives a different exposure, imager system 100 advantageously achieves a viewable image having increased dynamic range. Additionally, imager system 100 achieves a frame by combining image data generated by each of two sets of pixels without requiring a frame buffer, which advantageously reduces manufacturing cost. Furthermore, since the image data from each of two different exposures can be combined in real time, imager system 100 can advantageously provide a final frame without latency or delay.

As shown in FIG. 1, the output of non-interleaved image pipeline 112 and the output of the interleaved image pipeline 114 are coupled to image correction/conversion module 116. Image correction/conversion module 116 can be configured to perform image correction processes, such as gamma correction and color correction, on either the RGB image provided by non-interleaved image pipeline 112 or the RGB image provided by interleaved image pipeline 114, and convert the corrected RGB image into a YUV image in a manner known in the art. Further shown in FIG. 1, the resulting YUV image from image correction/conversion module 116 is further processed by image processing module 118 and outputted as a non-compressed YUV image on line 124 and also inputted into JPEG compression module 120. Image processing module 118 can provide contrast adjustment, color correction, and edge enhancement for the YUV image, for example. JPEG compression module 120 can be configured to receive the YUV image outputted by image processing module 118, compress the YUV image by utilizing a JPEG compression engine, and output a JPEG YUV image on line 122. Further shown in FIG. 1, statistics/firmware control module 126 includes statistics and firmware for controlling the processing of either interleaved image data or non-interleaved image data outputted by image sensor 102. The communication of statistics/firmware control module 126 within imager system 100 will be further discussed below in relation to FIG. 13.

Figure 2A:
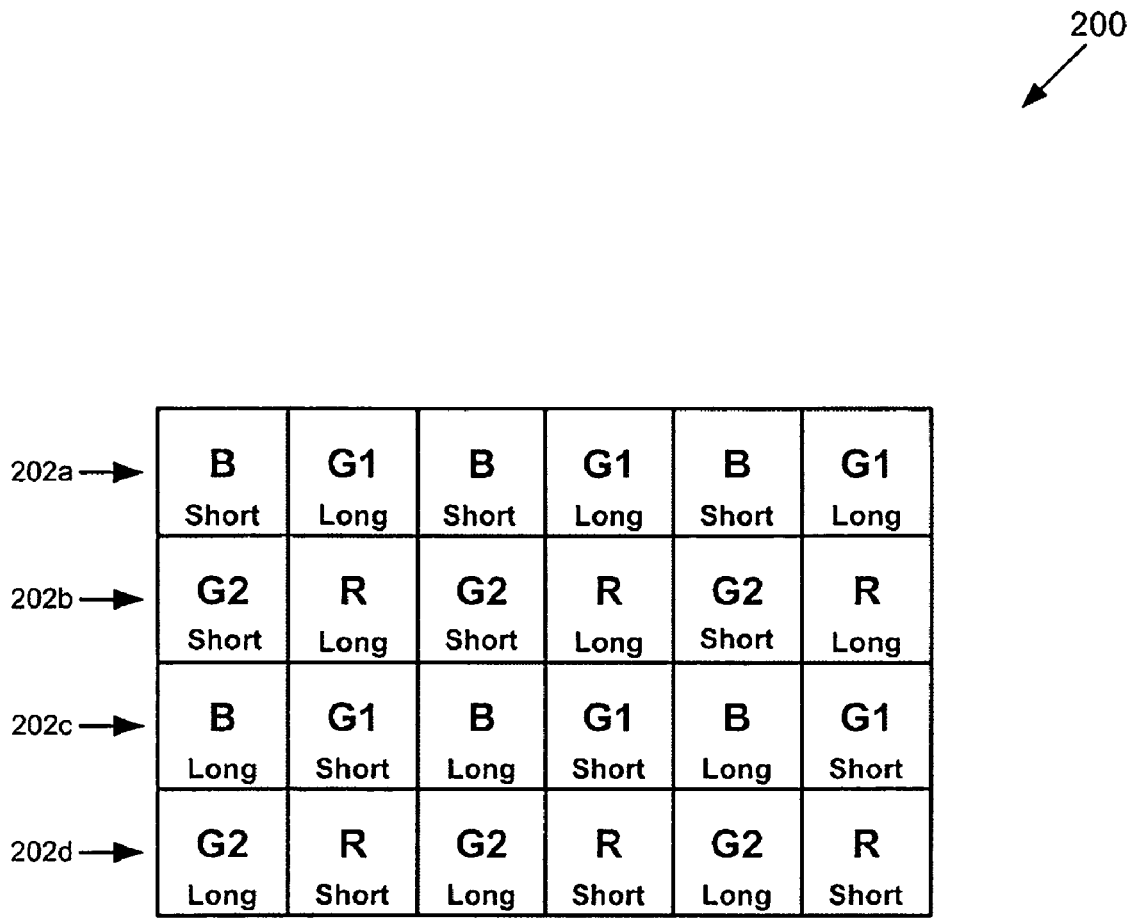
FIG. 2A illustrates a diagram of an exposure pattern for a pixel array according to one embodiment of the present invention.

FIG. 2A shows a diagram of an exemplary exposure pattern for an exemplary pixel array according to one embodiment of the present invention. Pixel array 200 includes pixel rows 202a, 202b, 202c, and 202d and can comprise a portion of a pixel array such as pixel array 104 in imager system 100 in FIG. 1. Pixel array 200 includes rows of pixels arranged in a Bayer pattern, where pixel rows 202a and 202c comprise alternating blue (B) pixels and green (G1) pixels and pixel rows 202b and 202d comprise alternating green (G2) and red (R) pixels.

In pixel array 200, the pixels are exposed in a ½ line Bayer interleave pattern, where the blue and the green pixels in pixel row 202a receive respective short and long exposures, where the green and the red pixels in pixel row 202b receive respective short and long exposures, where the blue and the green pixels in pixel row 202c receive respective long and short exposures, and where the green and the red pixels in pixel row 202d receive respective long and short exposures. The ½ line Bayer interleave pattern can be implemented easily by utilizing 4 T (four transistor) shared pixels.

Thus, in the ½ line Bayer interleave pattern, green pixels alternate between a short exposure and long exposure in each successive row and blue and red pixels alternate between a short exposure and a long exposure in every other row. Thus, two sets of exposure data can be obtained from each physical row of Bayer patterned pixels. In the first row of the repeating two row set that forms the Bayer pattern, each blue pixel can receive a short exposure, while in the next row that contains blue pixels, each blue pixel can receive a long exposure. The key feature is that in each physical row green pixel sets alternate between short and long exposures. This pattern (i.e. the ½ line Bayer interleave pattern) maximizes the edge information that is rendered in the luma channel and thus maximizes the resolution of the final image.

Figure 2B:
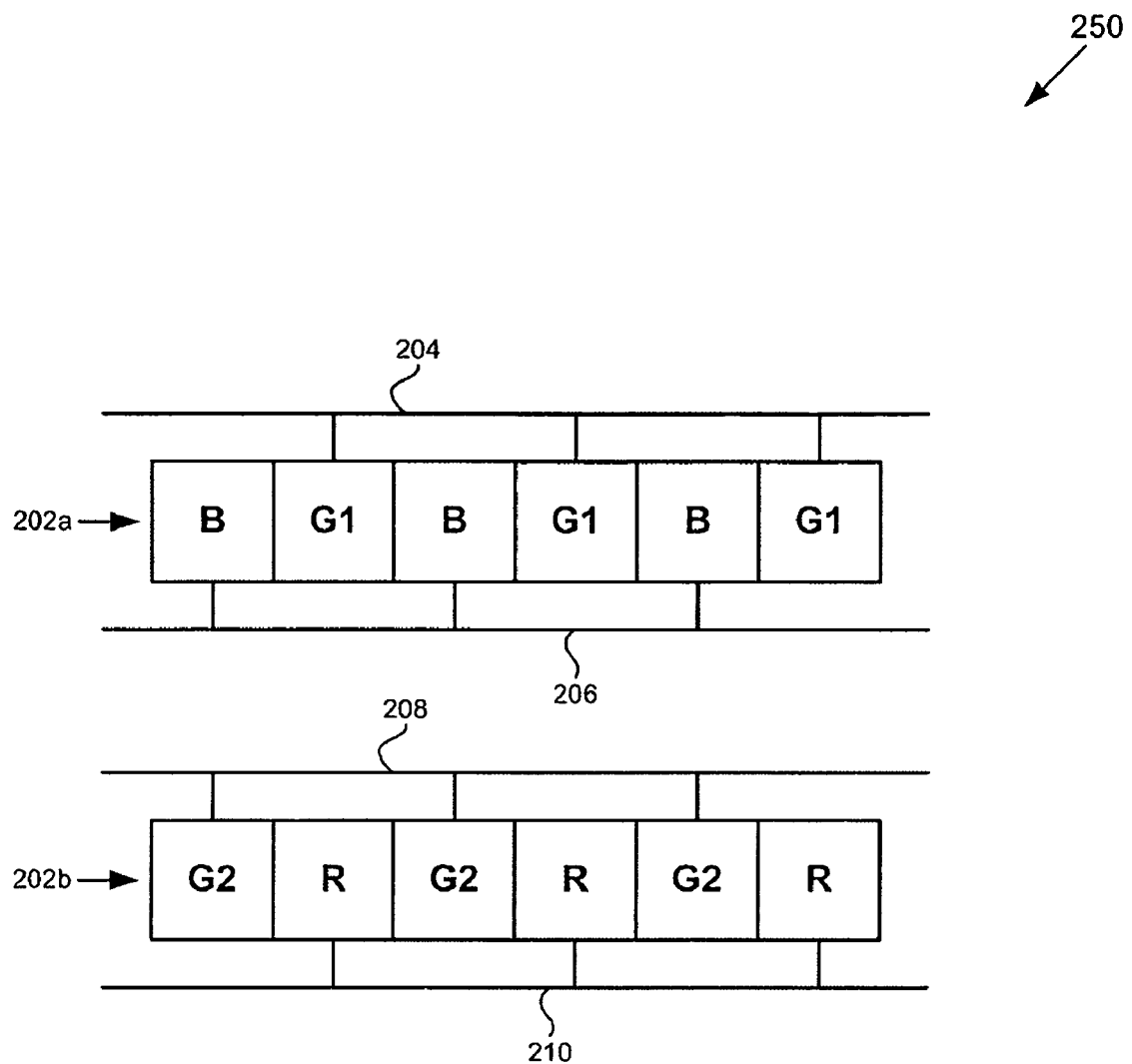
FIG. 2B illustrates a diagram of transfer gate routing for two rows of pixels in the pixel array in FIG. 2A.

FIG. 2B shows an exemplary transfer gate routing diagram for two rows of pixels in pixel array 200 in FIG. 2A. Transfer gate routing diagram 250 shows transfer gate routing for two rows of pixels (i.e. pixel rows 202a and 202b) for the ½ line Bayer interleave pattern shown in FIG. 2A. In transfer gate routing diagram 250, the transfer gates of the green (G1) pixels in pixel row 202a are coupled to transfer gate control line 204 and the transfer gates of the blue pixels in pixel row 202a are coupled to transfer gate control line 206. In pixel row 202b, the transfer gates of the green (G2) pixels are coupled to transfer gate control line 208 and the transfer gates of the red pixels are coupled to transfer gate control line 210.

Figure 3A:
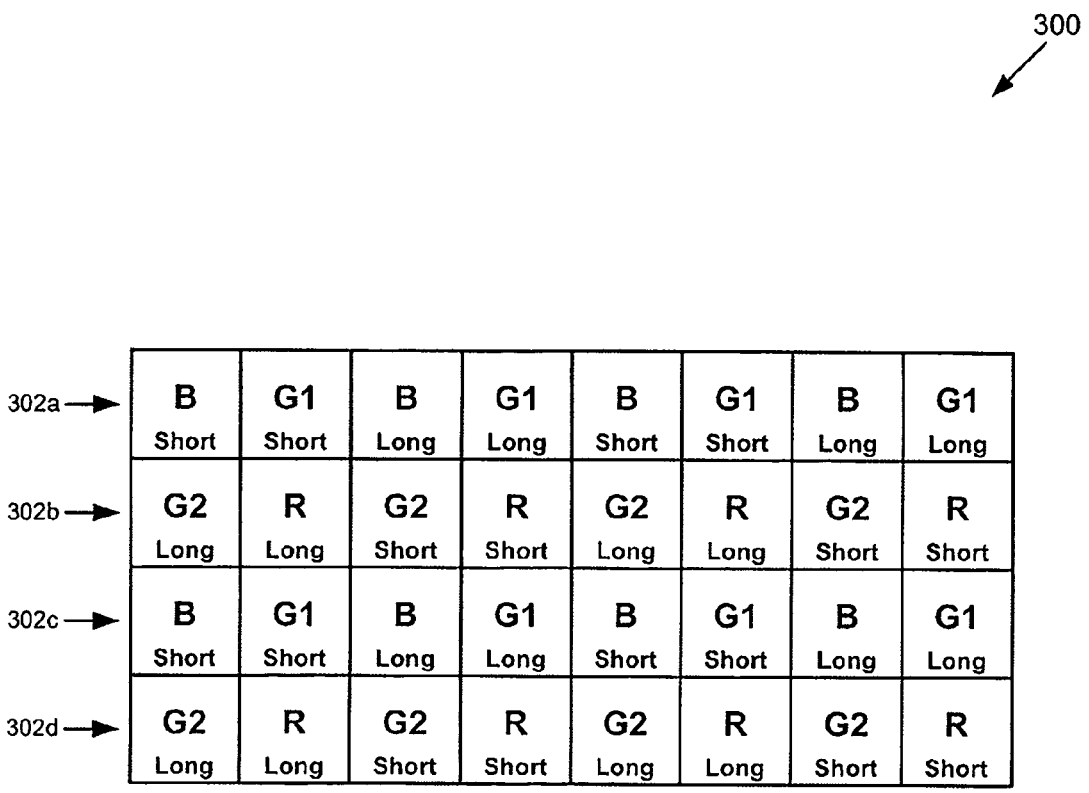
FIG. 3A illustrates a diagram of an exposure pattern for a pixel array according to one embodiment of the present invention.

FIG. 3A shows a diagram of an exemplary exposure pattern for an exemplary pixel array according to one embodiment of the present invention. Pixel array 300 includes pixel rows 302a, 302b, 302c, and 302d and can comprise a portion of a pixel array such as pixel array 104 in imager system 100 in FIG. 1. Pixel array 300 includes rows of pixels arranged in a Bayer pattern, where pixel rows 302a and 302c comprise alternating blue (B) pixels and green (G1) pixels and pixel rows 302b and 302d comprise alternating green (G2) and red (R) pixels.

In pixel array 300, the pixels are exposed in a zig-zag Bayer interleave pattern, where the blue and the green (G1) pixels in pixel row 302a receive alternating short and long exposures, where the green (G2) and the red pixels in pixel row 302b receive alternating long and short exposures, where the blue and the green (G1) pixels in pixel row 302c receive alternating short and long exposures, and where the green (G2) and the red pixels in pixel row 302d receive alternating long and short exposures.

The zig-zag Bayer interleave pattern requires one fewer line buffer in an image reconstruction pipeline (e.g. interleaved image pipeline 114 in FIG. 1) than the ½ line Bayer interleave pattern in FIGS. 2A and 2B. However, wiring the pixel control lines in the zig-zag Bayer interleave pattern requires changing the connection routing for the transfer gates in the pixel on an every other pixel of the same color basis. Although the zig-zag Bayer interleave pattern provides the most convenient way to route control lines in the pixel, it (i.e. the zig-zag Bayer interleave pattern) provides an improvement in vertical resolution of the image for a given number of interpolation memory lines in the digital image processing chain (e.g. interleaved image pipeline 114 in FIG. 1) used to reconstruct the image. It is noted that activation of the transfer wire on a pixel is required to set the integration time of all pixels in a row; thus, the same transfer wire must be connected to all pixels in the same row that are to receive the same exposure.

The zig-zag Bayer pattern refers to a crossing of control signals needed in some shared pixel layouts. This pattern uses horizontal exposure sets while the ½ line Bayer interleave pattern discussed above uses vertical exposure sets. The zig-zag or horizontal exposure set pattern also provides green information in each exposure set in each physical row of pixels.

Figure 3B:
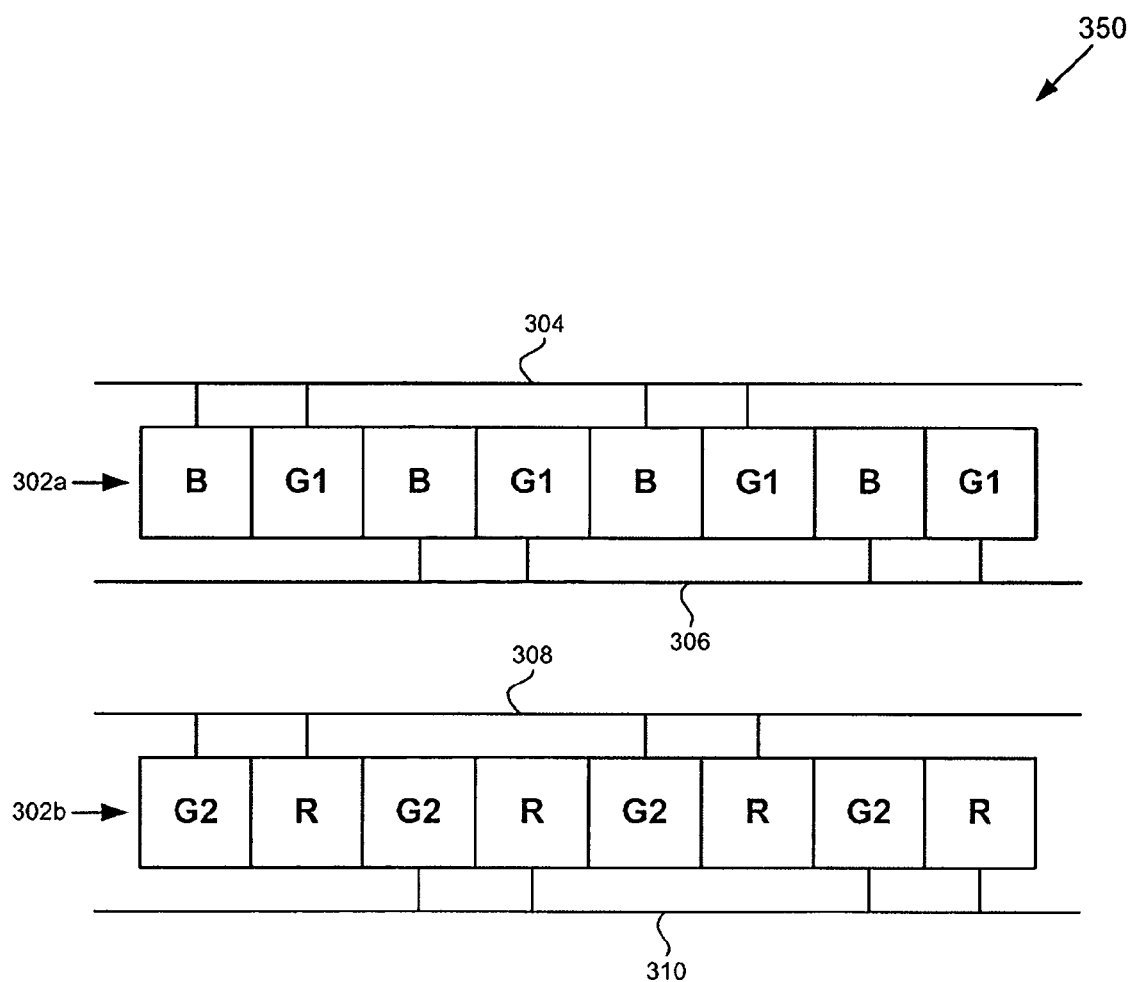
FIG. 3B illustrates a diagram of transfer gate routing for two rows of pixels in the pixel array in FIG. 3A.

FIG. 3B shows an exemplary transfer gate routing diagram for two rows of pixels in pixel array 300 in FIG. 3A. Transfer gate routing diagram 350 shows transfer gate routing for two rows of pixels (i.e. pixel rows 302a and 302b) for the zig-zag Bayer interleave pattern shown in FIG. 3A. In transfer gate routing diagram 350, the transfer gates of the blue pixels and the green (G1) pixels in pixel row 302a that receive a short exposure are coupled to transfer gate control line 304 and the transfer gates of the blue pixels and the green (G1) pixels in pixel row 302a that receive a long exposure are coupled to transfer gate control line 306. In pixel row 302b, the transfer gates of the green (G2) pixels and the red pixels that receive a long exposure are coupled to transfer gate control line 308 and the transfer gates of the green (G2) pixels and the red pixels that receive a short exposure are coupled to transfer gate control line 310.

Figure 4:
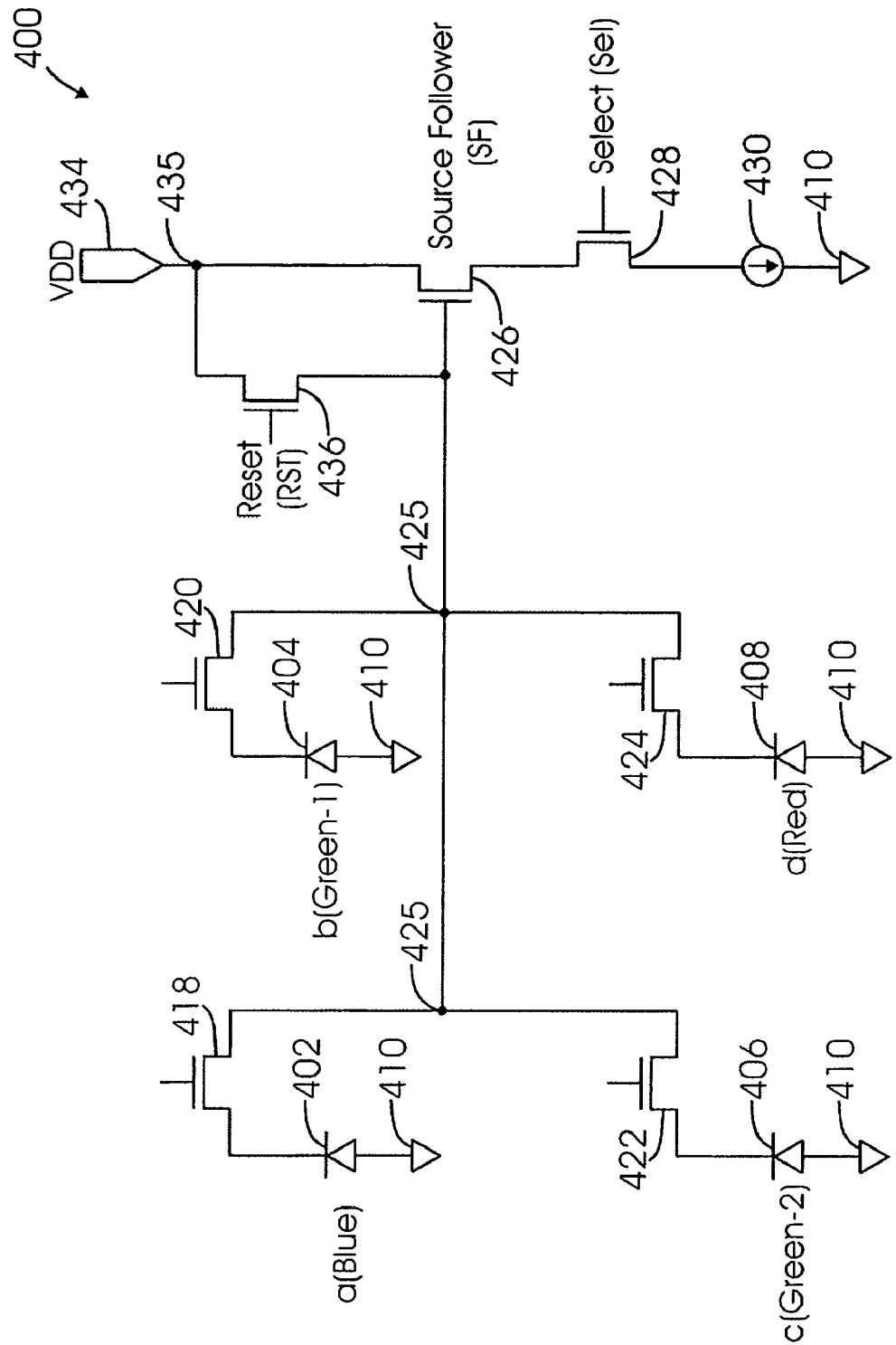
FIG. 4 illustrates a diagram of a four-transistor shared pixel circuit for an image sensor configured for a ½ line Bayer interleave pattern exposure according to one embodiment of the present invention.

FIG. 4 shows a schematic diagram of an exemplary four-transistor shared pixel circuit for an exemplary image sensor configured for a ½ line Bayer interleave pattern exposure according to one embodiment of the present invention. In four-transistor shared pixel circuit 400, photodiodes 402, 404, 406, and 408 are connected at one end to ground 410 and at another end to transistor switches 418, 420, 422, and 424, respectively. In the present application, transistor switches 418, 420, 422, and 424 are also referred to as "transfer gates 418, 420, 422, and 424." Photodiodes 402, 404, 406, and 408 are also referred to as pixels a (Blue), b (Green-1), c (Green-2), and d (red), respectively. Transfer gates 418, 420, 422, and 424 are each coupled to sense node 425, which is connected to the gate of source follower transistor 426. The source of source follower transistor 426 is connected to the drain of select transistor 428 and the source of select transistor 428 is connected to current source 430, which is connected to ground 410. The drains of source follower transistor 426 and reset transistor 436 are connected to voltage VDD 434 at node 435 and the source of reset transistor 436 is connected to sense node 425. Source follower transistor 426, select transistor 428, and reset transistor 436 can each comprise an NFET, for example.

In a sensor array, such as sensor array 104 in FIG. 1, four-transistor shared pixel circuit 400 is repeated throughout the sensor array. The pattern of pixels a, b, c, and d is illustrated in Table 1 below.

TABLE 1

|   | 1 | 2 | 3 | 4 | 5 | n |
|---|---|---|---|---|---|---|
| 1 | a | b | a | b | a | ... |
| 2 | c | d | c | d | c | ... |
| 3 | a | b | a | b | a | ... |
| 4 | c | d | c | d | c | ... |
| n | ... | ... | ... | ... | ... | |

For the ½ line Bayer interleave pattern, four-transistor shared pixel circuit 400 does not require extra control lines or extra routing. In operation, the various transistors in four-transistor shared pixel circuit 400 are activated according to a timing diagram, which is discussed below in reference to FIG. 5.

Figure 5:
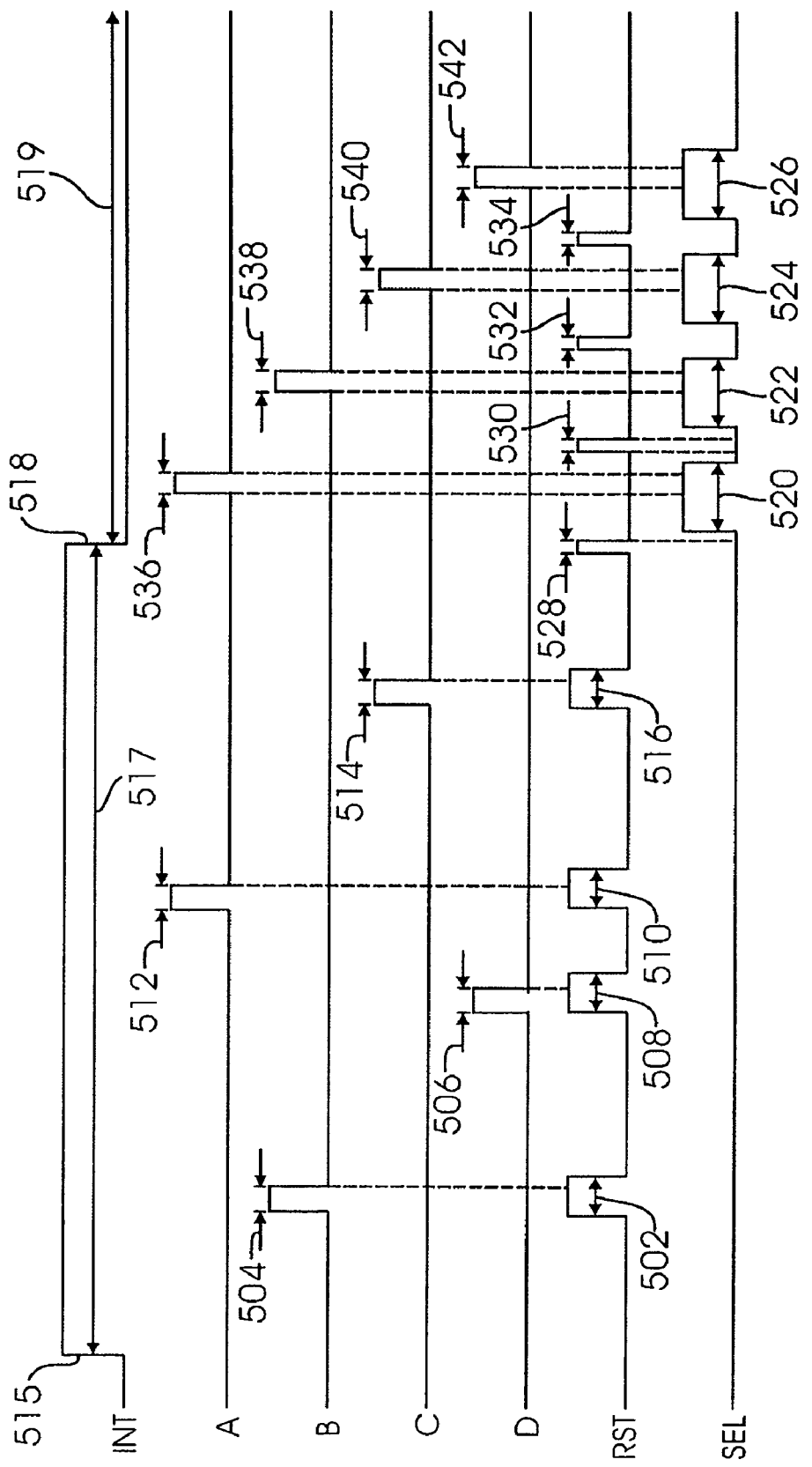
FIG. 5 illustrates a timing diagram for the four-transistor shared pixel circuit in FIG. 4 according to one embodiment of the present invention.

Referring to FIG. 5, an exemplary timing diagram for four-transistor shared pixel circuit 400 is shown according to one embodiment of the present invention. Timing diagram 500 can generally be divided into two sections: integration time period 517 and readout time period 519. In timing diagram 500, A, B, C, and D refer, respectively, to transfer gates 418, 420, 422, and 424 in FIG. 4. Also, RST and SEL refer, respectively, to reset transistor 436 and select transistor 428 in FIG. 4. During integration period 517, reset transistor 436 is on during time period 502 and transfer gate 420 closes at the end of time period 504 to start a long integration period of pixel b (i.e. photodiode 404). Transfer gate 424 is closed at the end of time period 506 to start a long integration period of pixel d (i.e. photodiode 408).

TABLE 2

(½ line Bayer interleave pattern)

| | | Col. | | | | ½ |
|---|---|---|---|---|---|---|
| 1 | 2 | 3 | 4 | 5 | n | Rows |
| $B_S$ | $G_L$ | $B_S$ | $G_L$ | $B_S$ | ... | 1 |
| $G_S$ | $R_L$ | $G_S$ | $R_L$ | $G_S$ | ... | 2 |
| $B_L$ | $G_S$ | $B_L$ | $G_S$ | $B_L$ | ... | 3 |
| $G_L$ | $R_S$ | $G_L$ | $R_S$ | $G_L$ | ... | 4 |
| ... | ... | ... | ... | ... | | n |

Referring to Table 2, the respective long integration periods of pixels b and d discussed above correspond to table locations Column 2, rows 1 and 2, where the first green pixel ($G_L$) and the red pixel ($R_L$) each receive a long (L) exposure. Reset transistor 436 is on again during time period 508, where the long exposure of pixel d, which occurs between time periods 506 and 542, overlaps in time, but turns off after transfer gate 424 closes. Reset transistor 436 is on again during time period 510 and transfer gate 418 is closed at the end of time period 512 to start a short integration period of pixel a, which occurs between time periods 512 and 536. Transfer gate 422 is closed at the end of time period 514 to begin a short integration period of pixel c (i.e. photodiode 406), which occurs between time period 514 and 540. Integration time period 517, which begins at time point 515, ends at time point 518.

Time periods 520, 522, 524, and 526, during which select transistor 428 is turned on, occur after integration time period 517 ends. Reset transistor 436 is on during time periods 528, 530, 532, and 534. After the first reset (at end of time period 528), transfer gate 418 is closed during time period 536 while select transistor 428 is on during time period 520, which allows pixel a (i.e. photodiode 402) to be read. After the second reset (at end of time period 530), transfer gate 420 is closed during time 538 while select transistor is on during time period 522, which allows pixel b (i.e. photodiode 404) to be read. After the third reset (at the end of time period 532), transfer gate 422 is closed during time period 540 while select transistor 428 is on during time period 524, which allows pixel c (i.e. photodiode 406) to be read. After the fourth reset (at the end of time period 534), transfer gate 424 is closed during time period 542 while select transistor 428 is on during time period 526, which allows pixel d (i.e. photodiode 408) to be read.

FIGS. 6A, 6B, 6C, 6D, 6E, 6F, 6G, and 6H (hereinafter FIGS. 6A through 6H) show an exemplary rolling shutter sequence according to one embodiment of the present invention. In FIGS. 6A through 6H, only two colors (i.e. blue and green) are shown to simplify the diagram. Thus, the "a" ½ lines in FIGS. 6A through 6H comprise green (G) pixels and the "b" ½ lines in FIGS. 6A through 6H comprise blue (B) pixels.

In the interleaved image sensor readout (e.g. the interleaved readout of image sensor 102 in imager system 100 in FIG. 1), control of the image sensor's rolling shutter mechanism is modified to allow an additional set of pointers to be inserted. In the two line integration example shown in FIGS. 6A through 6H, an additional pointer is utilized to reset the image half way through the two line interval. However, this reset is applied to only ½ of the line. In each line of pixels in FIGS. 6A through 6H, ½ of the line receives a short exposure (indicated by "S") and ½ of the line receives a long exposure (indicated by "L"). The ½ line that receives the short exposure is instructed to reset after one line of integration, while the ½ line that receives the long exposure is allowed to continue. Both the ½ line with the long exposure and the ½ line with the short exposure are then read out at the same time at the end of two lines.

In a conventional rolling shutter, a read/reset point travels along the lines at a fixed spacing. In the interleaved image sensor (e.g. image sensor 102 in FIG. 1), there are three pointers that travel along the line. The third pointer is an intermediate reset pointer that resets one of the sets of pixels to restart the exposure. The operations that are performed on the subsets of each line are preferably performed in the same order and in quick succession. Also, the same number of operations should be performed to insure even loading of analog circuits in the image sensor. Accordingly, when the intermediate reset of the short exposure pixel set is performed, a "dummy reset" of a dummy pixel line can be performed as a surrogate for the reset of the long exposure pixel set in the same physical row. It is noted that a dummy pixel line is an active line of pixels that is not used to form the final image but can be used to balance operations and maintain a symmetrical loading of analog circuits in the image sensor. In FIGS. 6A through 6H, the "a" lines (e.g. lines 1a, 2a ...) include green pixels and the "b" lines (e.g. lines 1b, 2b ...) include blue pixels.

Figure 6A:
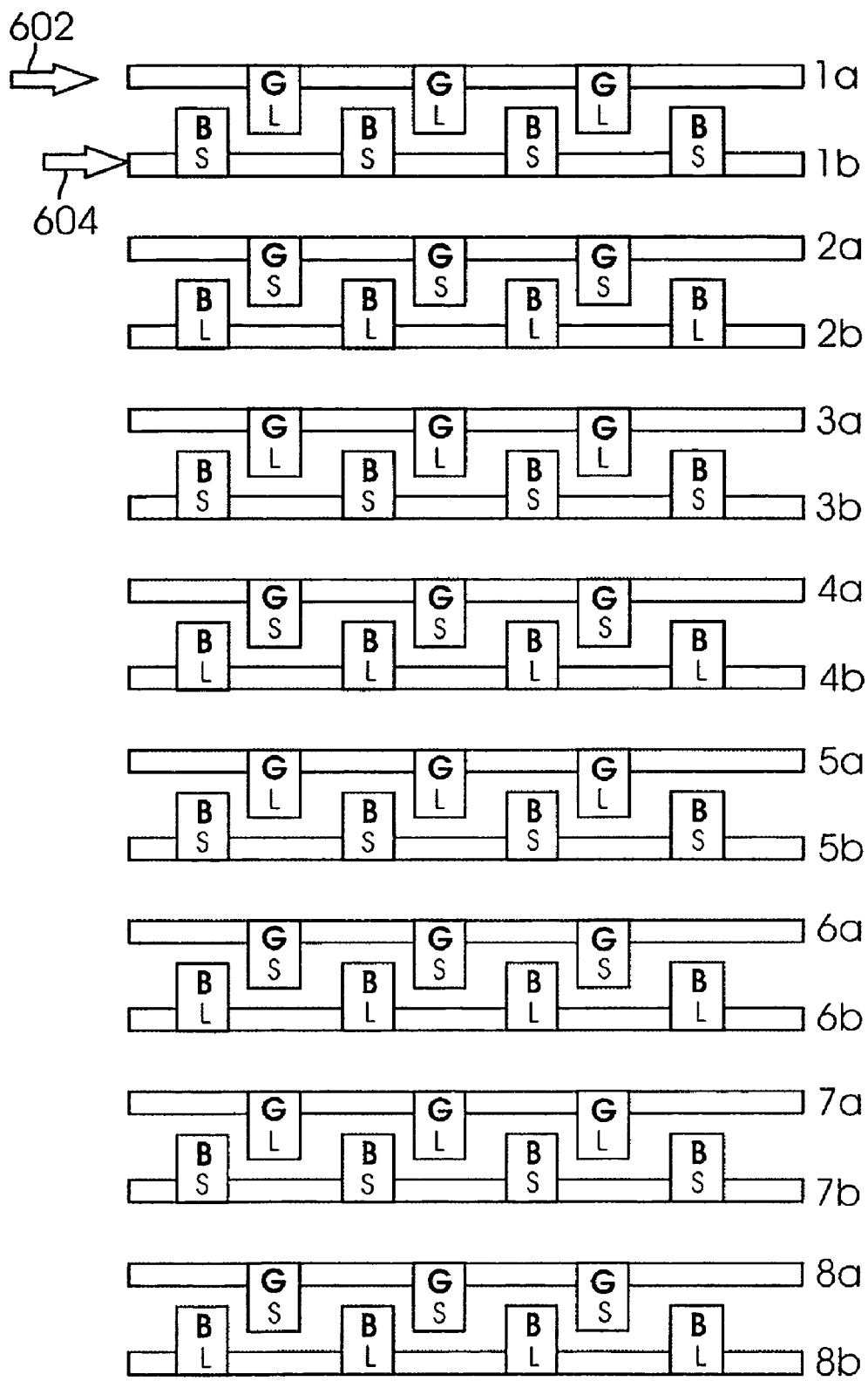
FIG. 6A illustrates a diagram of a portion of a rolling shutter sequence according to one embodiment of the present invention.
Figure 6B:
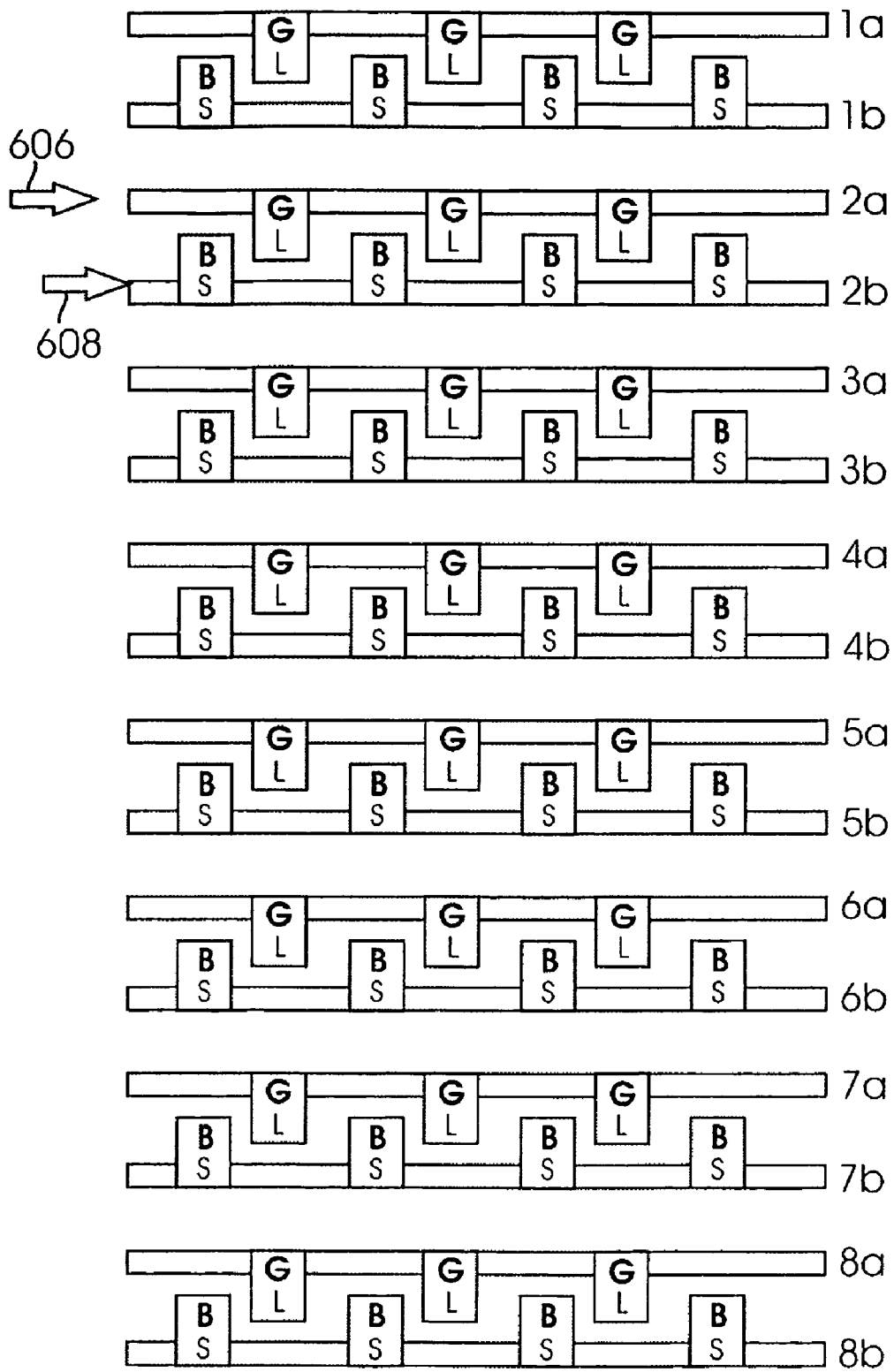
FIG. 6B illustrates a diagram of a portion of a rolling shutter sequence according to one embodiment of the present invention.
Figure 6C:
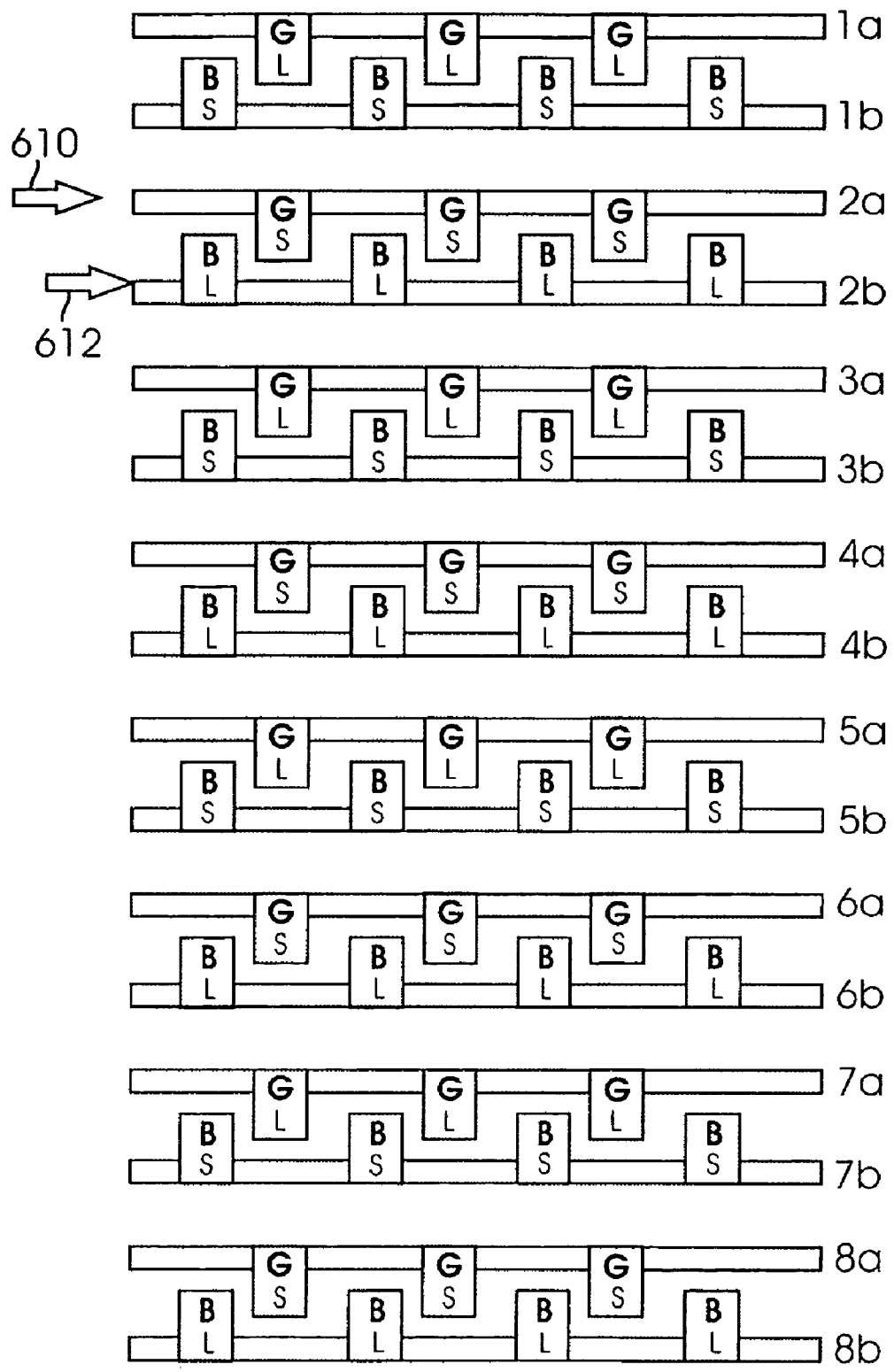
FIG. 6C illustrates a diagram of a portion of a rolling shutter sequence according to one embodiment of the present invention.
Figure 6D:
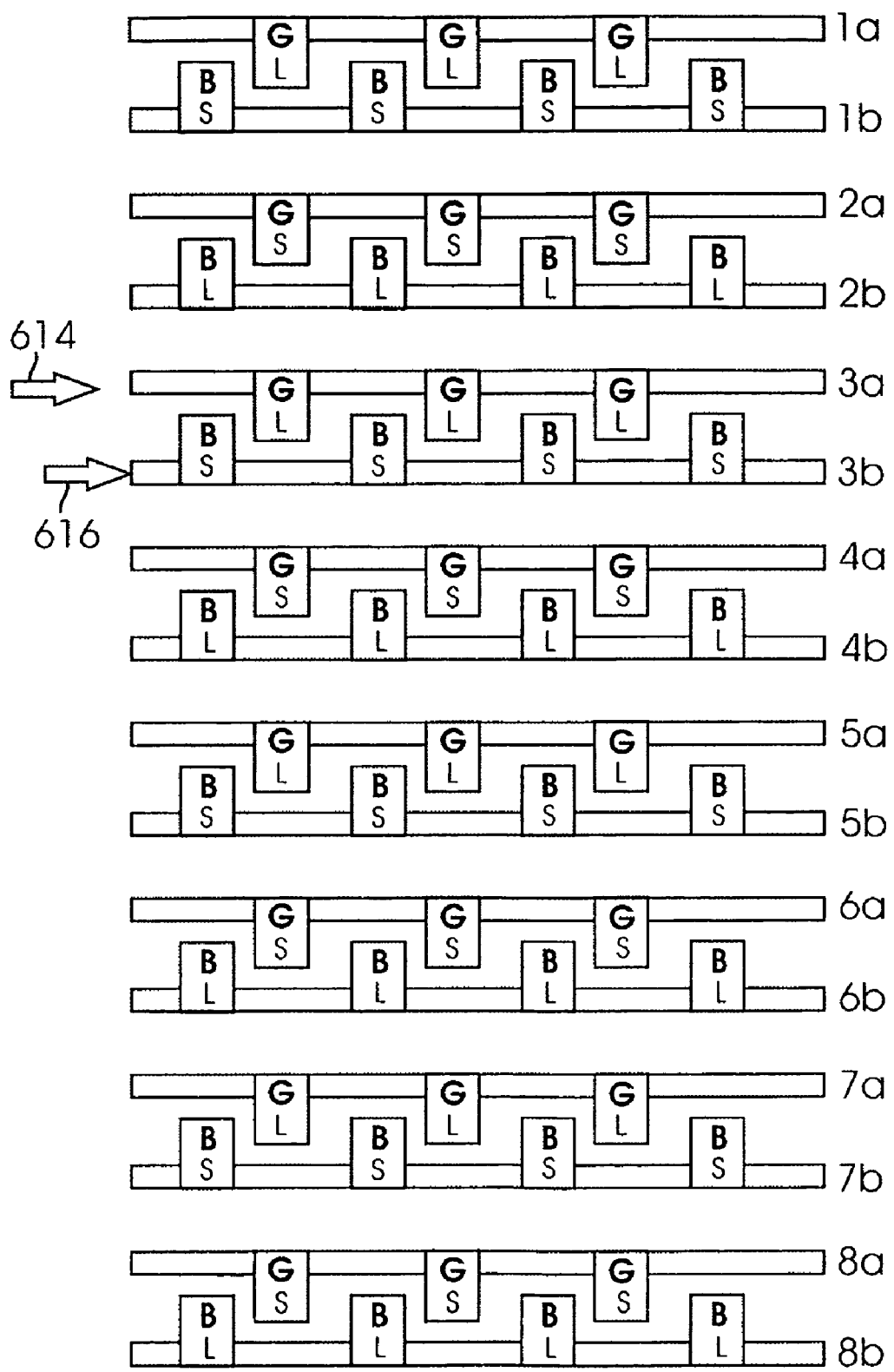
FIG. 6D illustrates a portion of a rolling shutter sequence according to one embodiment of the present invention.
Figure 6E:
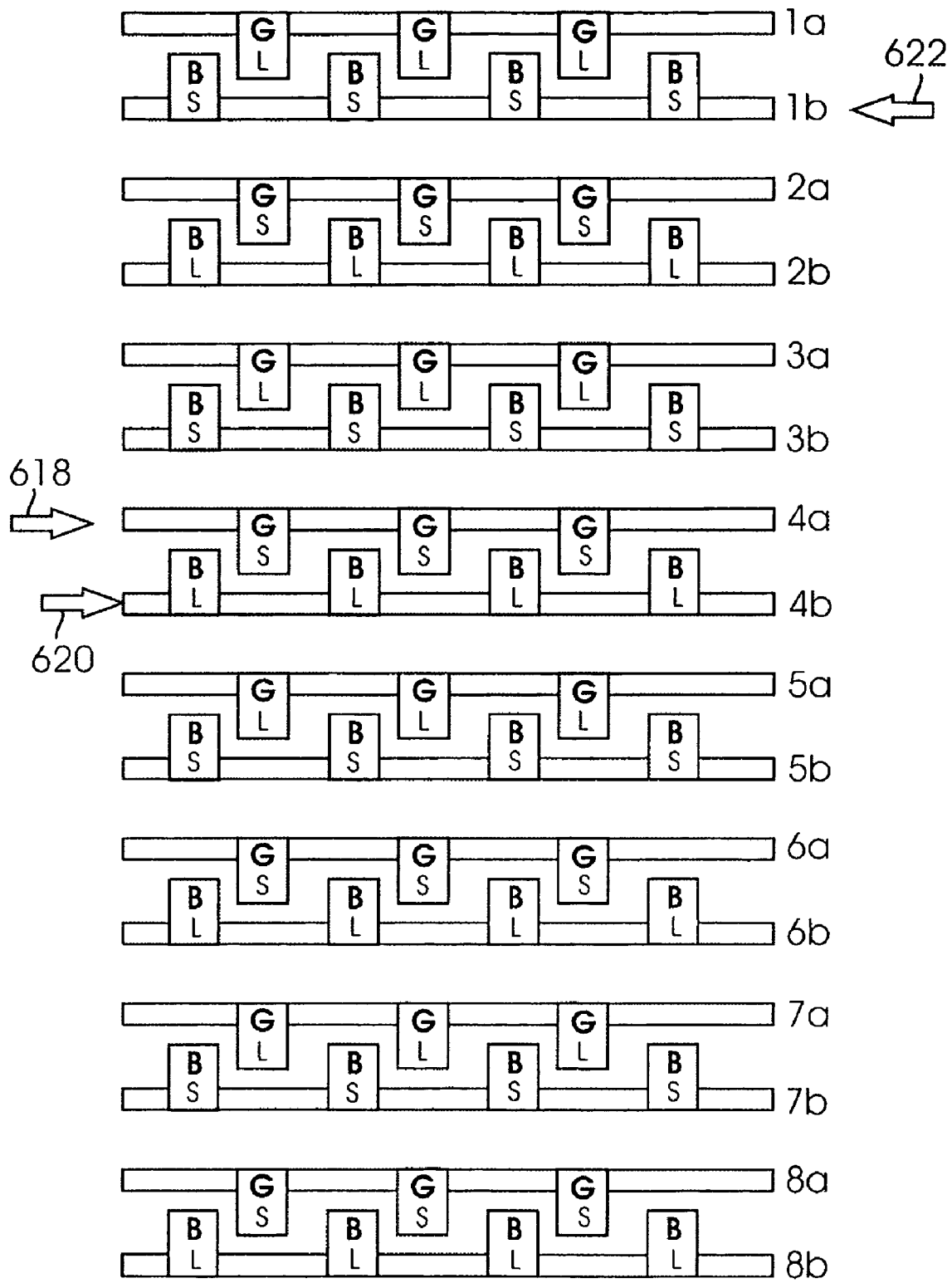
FIG. 6E illustrates a diagram of a portion of a rolling shutter sequence according to one embodiment of the present invention.

In FIG. 6A, at line time step 1, line 1a is reset (indicated by arrow 602) and then line 1b is reset (indicated by arrow 604) in rapid succession to start exposure. In FIG. 6B, at line time step 2, first reset line pointer is at line 2a (indicated by arrow 606), and at line 2b (indicated by arrow 608) to start exposure. In FIG. 6C, at line time step 2, line interval 2: line 2a is reset (indicated by arrow 610) and then line 2b is reset (indicated by arrow 612) in rapid succession to start exposure. In FIG. 6D, at line time step 3, line interval 3: line 3a is reset (indicated by arrow 614) and then line 3b is reset (indicated by arrow 616) in rapid succession to start exposure. In FIG. 6E, at line time step 4, line interval 4: line 4a is reset (indicated by arrow 618) and then line 4b is reset (indicated by arrow 620) in rapid succession to start exposure. Also, reset of line 1b (indicated by arrow 622) is repeated to restart exposure and a dummy line is reset instead of line 1a.

Figure 6F:
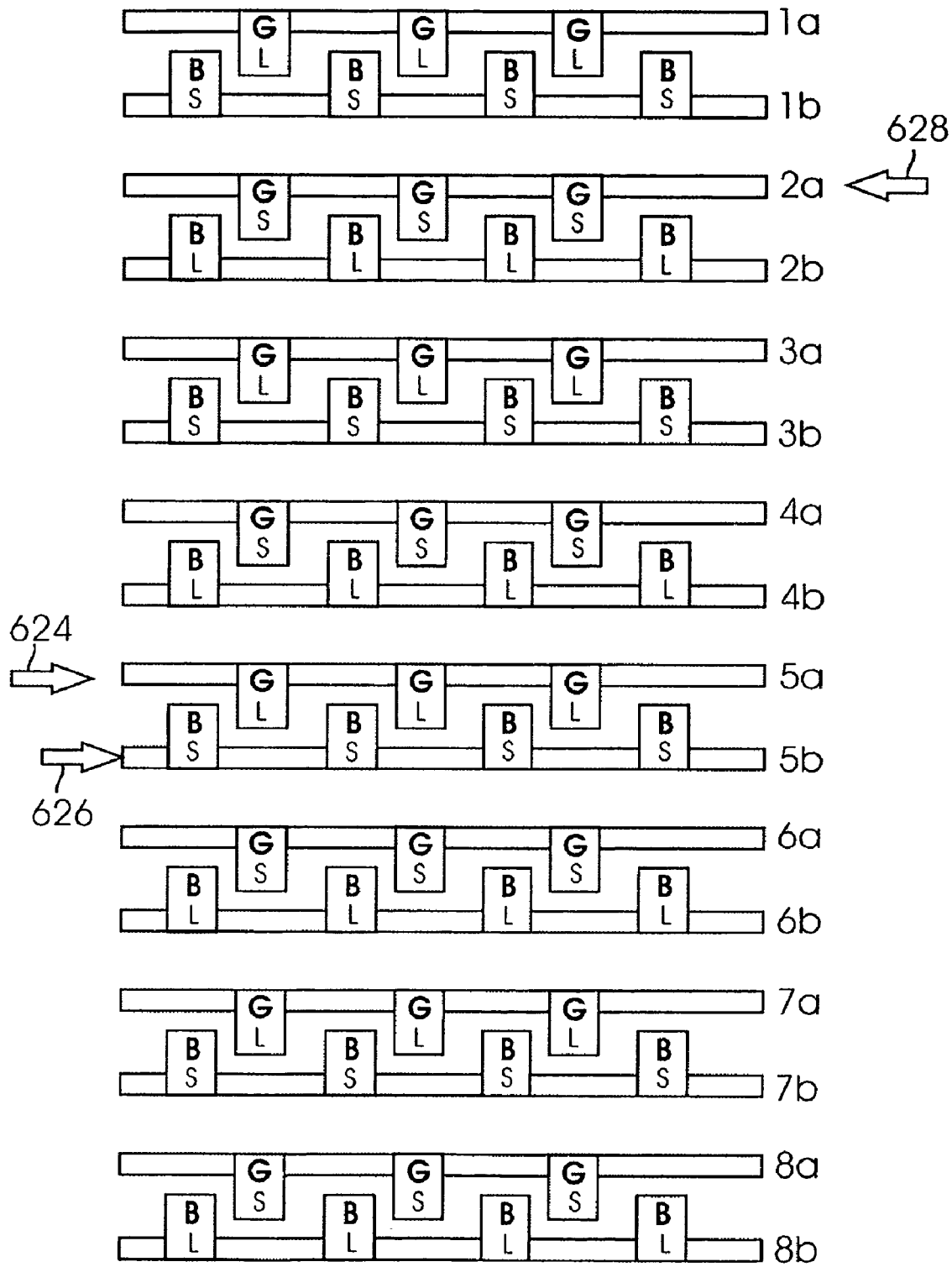
FIG. 6F illustrates a diagram of a portion of a rolling shutter sequence according to one embodiment of the present invention.
Figure 6G:
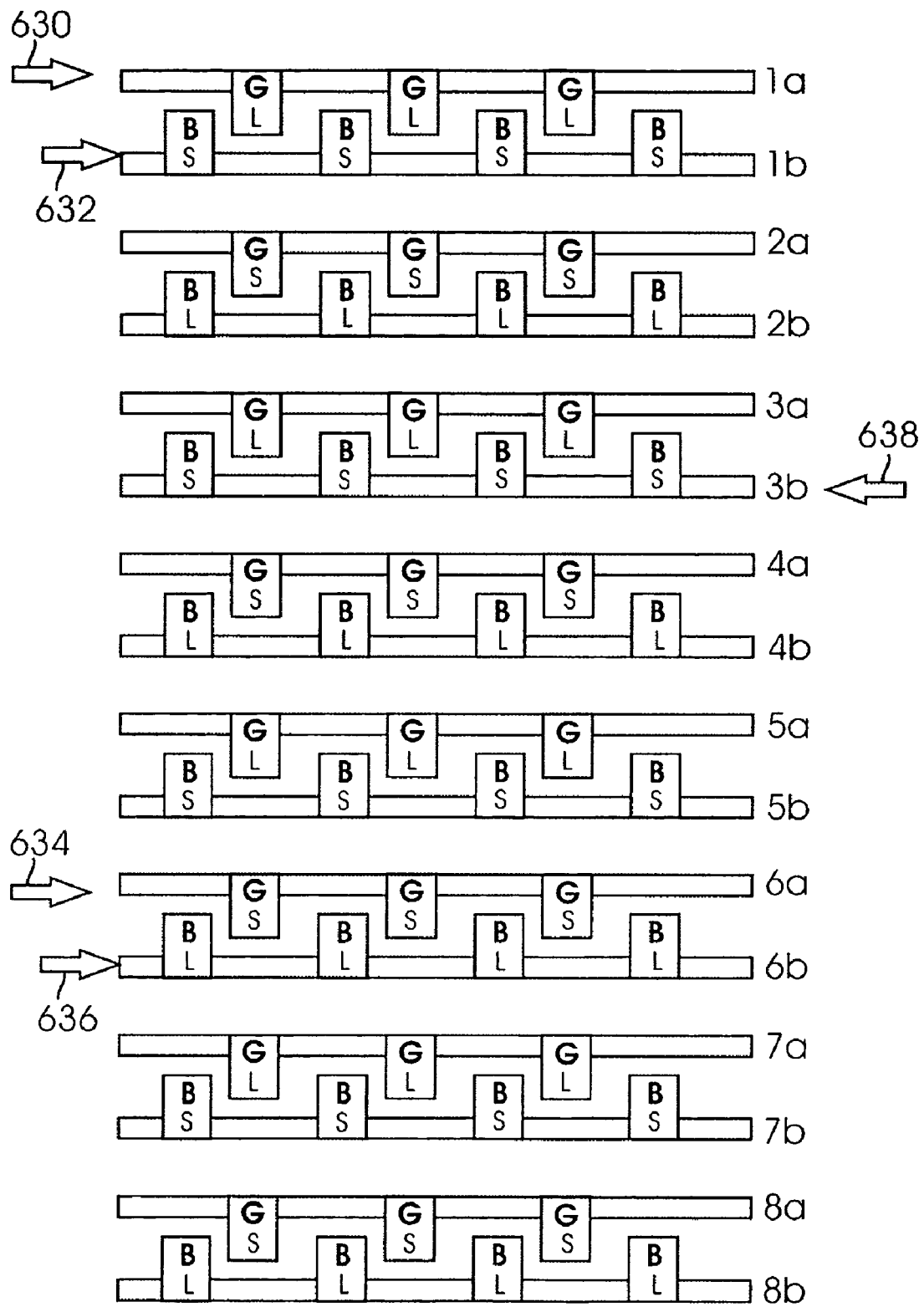
FIG. 6G illustrates a diagram of a portion of a rolling shutter sequence according to one embodiment of the present invention.
Figure 6H:
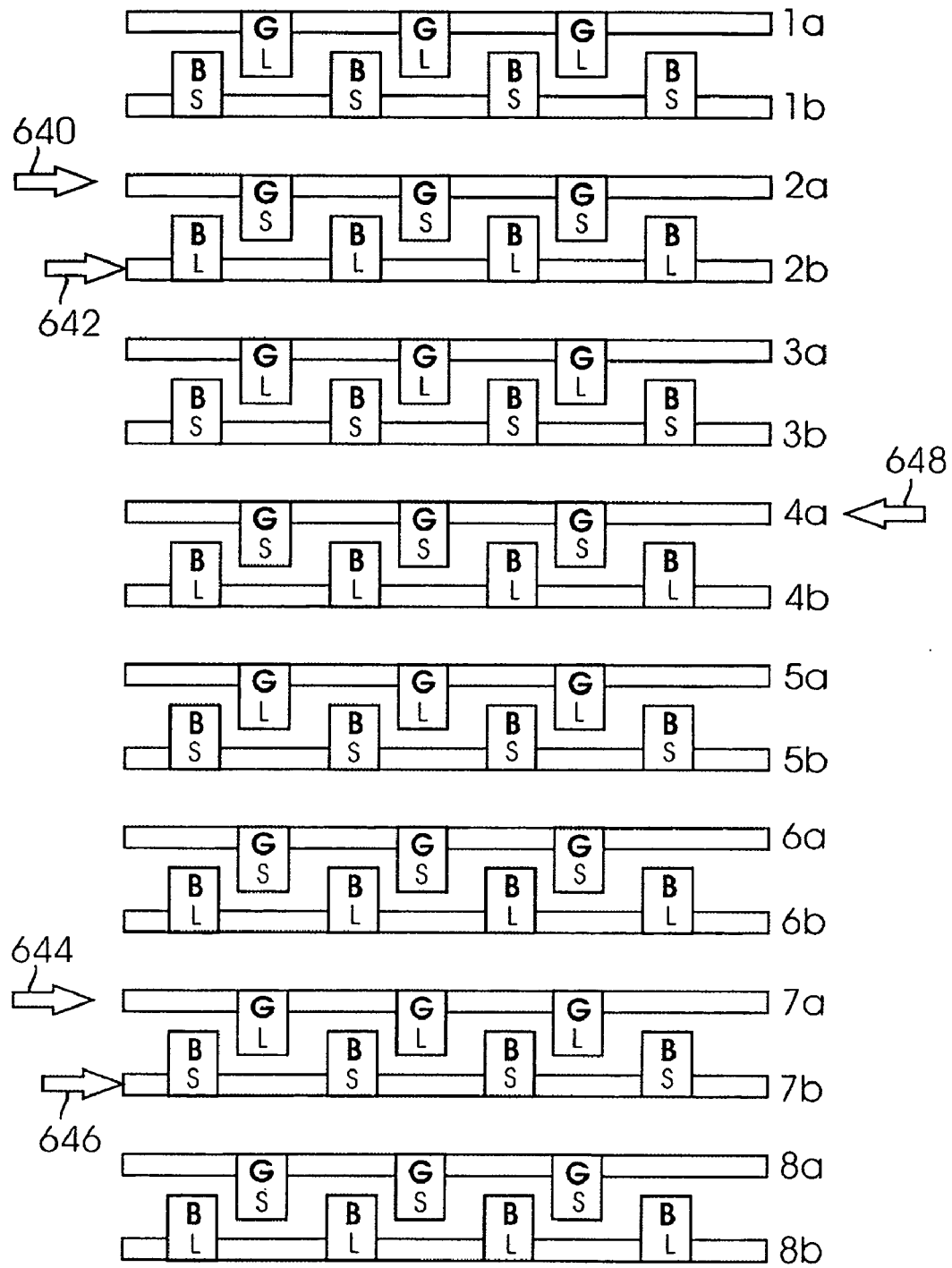
FIG. 6H illustrates a diagram of a portion of a rolling shutter sequence according to one embodiment of the present invention.

In FIG. 6F, at line time step 5, line interval 5: line 5a is reset (indicated by arrow 624) and then line 5b is reset (indicated by arrow 626) in rapid succession to start exposure. Also, reset of line 2a (indicated by arrow 628) is repeated to restart exposure and a dummy line is reset instead of line 2b. In FIG. 6G, at line time step 6, line interval 6: line 6a is reset (indicated by arrow 634) and then line 6b is reset (indicated by arrow 636) in rapid succession to start exposure. Also, reset of line 3b (indicated by arrow 638) is repeated to restart exposure and a dummy line is reset instead of line 2a. Further, lines 1a and 1b are read and reset (indicated by respective arrows 630 and 632) in rapid succession. In FIG. 3H, at line time step 7, line interval 7: line 7a is reset (indicated by arrow 644) and then line 7b is reset (indicated by arrow 646) in rapid succession to start exposure. Also, reset of line 4a (indicated by arrow 648) is repeated to restart exposure and a dummy line is reset instead of line 4b. Further, lines 2a and 2b are read and reset (indicated by respective arrows 640 and 642) in rapid succession.

It is noted that CMOS image sensor control logic (e.g. image sensor control block 106 in image sensor 102 in FIG. 1)

and the rolling shutter concept illustrated in FIGS. 6A through 6H can be extended to include more than two exposures on more than two sets of pixels.

Figure 7:
FIG. 7 illustrates a diagram of an exposure pattern for a pixel array according to one embodiment of the present invention.

FIG. 7 shows a diagram of an exemplary exposure pattern for an exemplary pixel array according to one embodiment of the present invention. Pixel array 700 includes pixel rows 702a, 702b, 702c, 702d, 702e, and 702f and can comprise a portion of a pixel array such as pixel array 104 in imager system 100 in FIG. 1. Pixel array 700 includes rows of pixels arranged in a Bayer pattern, where pixel rows 702a, 702c, and 702e comprise alternating blue (B) pixels and green (G1) pixels and pixel rows 702b, and 702d, and 702f comprise alternating green (G2) and red (R) pixels.

In pixel array 700, the pixels are exposed in a complex alternating Bayer interleave pattern, which has a symmetrical arrangement of exposure sets for each color. In pixel array 770, pixels of each color form a checkerboard pattern. In pixel array 700, each pixel of a particular color and exposure is centered between pixels of the same color but having an alternate exposure. For example, a red pixel in pixel row 702d having a short exposure is centered between adjacent red pixels in pixel row 702d that have a long exposure and centered between red pixels in pixel rows 702b and 702f that have long exposures.

The complex alternating Bayer interleave pattern in pixel array 700 facilitates wide dynamic range color interpolation and also facilitates implementation of bad pixel correction, since pixels of the same color and same exposure are spaced in close proximity. The complex alternating Bayer interleave pattern also provides improved resolution in the final wide dynamic range image compared to some alternate arrangements.

Figure 8:
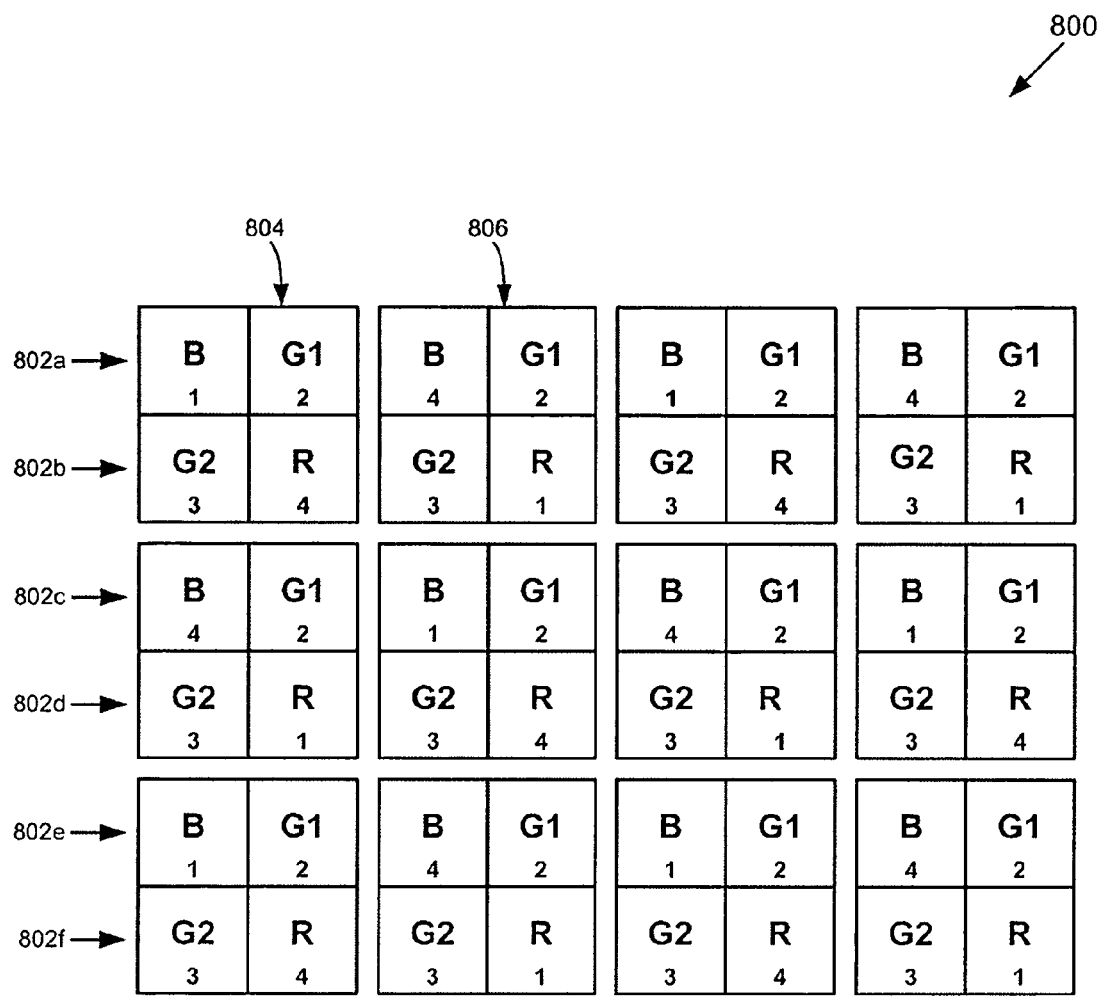
FIG. 8 illustrates a diagram of a readout sequence for a pixel array according to one embodiment of the present invention.

FIG. 8 shows a diagram of an exemplary readout sequence for a pixel array according to one embodiment of the invention. Pixel array 800 includes pixel rows 802a, 802b, 802c, 802d, 802e, and 802f and can comprise a portion of a pixel array such as pixel array 104 in imager system 100 in FIG. 1. Pixel array 800 includes rows of pixels arranged in a Bayer pattern, where pixel rows 802a, 802c, and 802e comprise alternating blue (B) pixels and green (G1) pixels and pixel rows 802b, and 802d, and 802f comprise alternating green (G2) and red (R) pixels.

In pixel array 800, pixels are group in quads (i.e. blocks comprising four pixels), such as quad 804, which includes blue (B) and green (G1) pixels in pixel row 802a and green (G2) and red (R) pixels in pixel row 802b. Each quad, such as quad 804, is served by a single sense node. For example, quad 804 can be served by sense node 425 in four-transistor shared pixel circuit 400 in FIG. 4. The blue (B) pixel in quad 804 can be controlled by transfer gate 418 in pixel circuit 400, the green (G1) pixel can be controlled by transfer gate 420, the green (G2) pixel can be controlled by transfer gate 422, and the red (R) pixel can be controlled by transferred gate 424, for example. One of four pixels in a quad is selected by a pixel select line (not shown in FIG. 8). In the readout sequence in pixel array 800, every other quad has alternate numbering and is connected to pixel select lines in an alternate way. For example, in quad 804, the read sequence is: blue (B) pixel, green (G1) pixel, green (G2) pixel, and red (R) pixel. In contrast, the readout sequence in adjacent quad 806 is: red (R) pixel, green (G1) pixel, green (G2) pixel, and blue (B) pixel.

In pixel array 800, pixels labeled as "1" are selected by pixel select line 1 (not shown in FIG. 8), pixels labeled as "2" are selected by pixel select line 2 (not shown in FIG. 8), etc. In pixel array 800, all of the pixels in a pixel row selected by a given pixel select line have the same integration time. In pixel array 800, if pixels labeled as "1" and "2" have integration time T1 (e.g. a short exposure) and pixels labeled as "3" and "4" have integration time T2 (e.g. a long exposure), the alternate selection pattern in pixel array 800 can be used to implement the complex alternating Bayer interleave pattern in pixel array 700 in FIG. 7.

In pixel array 800, pixels with the same number (e.g. labeled as "1") have a corresponding transfer gate connected to the same control line. Thus, for pixels labeled "1" and "4," the transfer gate interconnect line needs to serve pixels that are two rows. Pixels that have the same transfer gate interconnect line can be reset and read at the same time.

FIG. 9A shows a diagram of an exemplary exposure pattern for an exemplary pixel array according to one embodiment of the present invention. Pixel array 900 includes pixel rows 902a, 902b, 902c, 902d, 902e, 902f, 902g, and 902h and can comprise a portion of a pixel array such as pixel array 104 in imager system 100 in FIG. 1. Pixel array 900 includes rows of pixels arranged in an alternating flipped pattern, where pixel rows 902a, 902d, 902e, and 902h comprise alternating blue (B) pixels and green (G1) pixels and pixel rows 902b, 902c, 902f, and 902g, comprise alternating green (G2) and red (R) pixels.

In pixel array 900, adjacent pixels in each row each receive a different exposure. For example, blue pixels in row 902a receive a short exposure and green (G1) pixels in row 902a receive a long exposure. In the alternating flipped pattern pixel arrangement in pixel array 900, all transfer gate control lines address the same physical row of pixels, which facilitates implementation of the alternating flipped pattern pixel arrangement. The alternating flipped pattern pixel arrangement provides improved interpolation for green pixel values in the wide dynamic range image. However, the alternating flipped pattern is not a standard Bayer pattern and can result in some loss of resolution for a progressive readout.

Figure 9B:
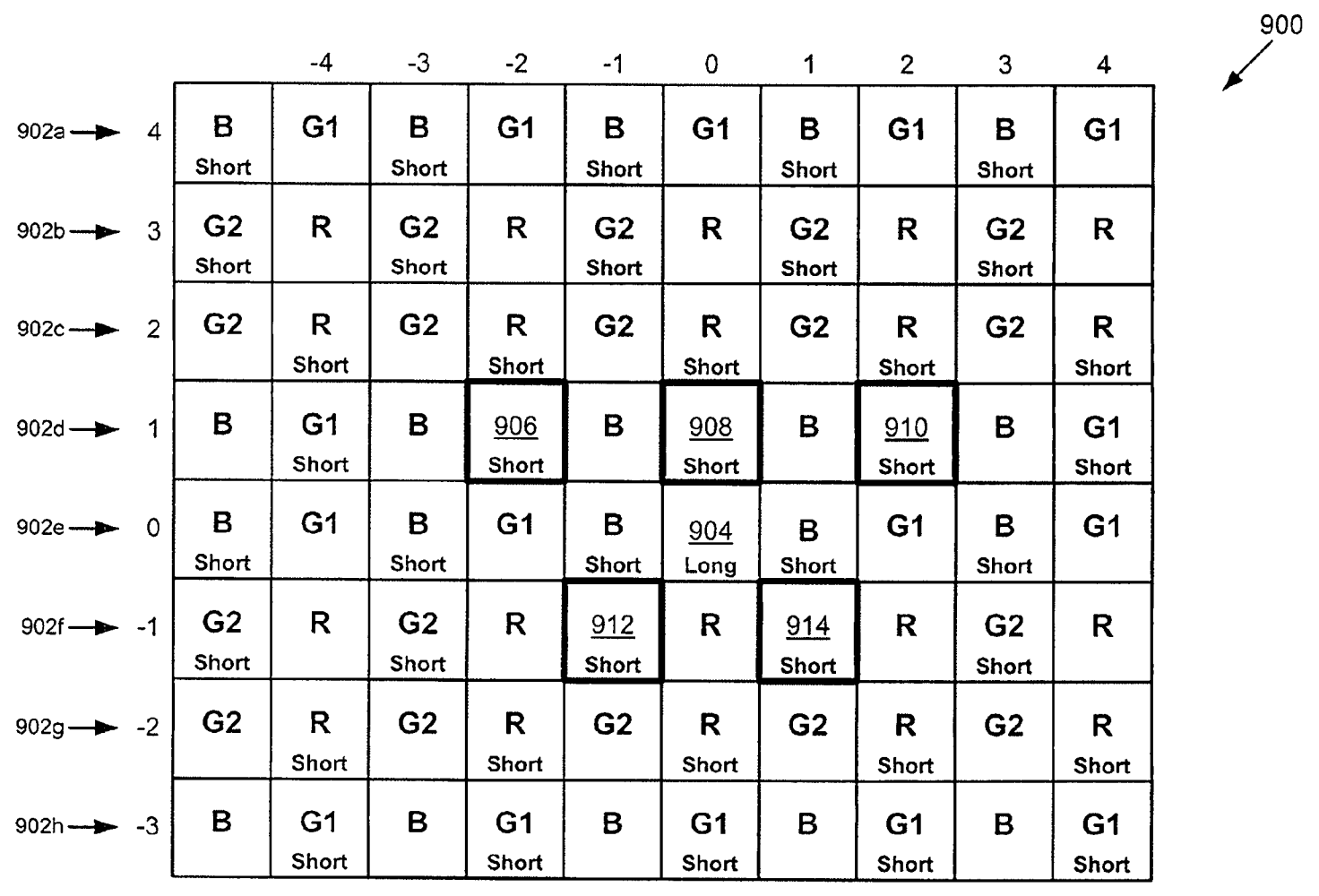

FIG. 9B shows a diagram of exposure data interpolation for a pixel in the alternating flipped pattern in FIG. 9A. When composing a wide dynamic range image it is necessary to interpolate missing data from the alternate exposure set. For example, if pixels that receive a long exposure are overexposed, then the only available information is data from the short exposure. In the example in FIG. 9B, green short exposure data needs to be interpolated at green long exposure pixel location 904 from nearby green short exposure values at pixel locations 906, 908, 910, 912, and 914.

Various interpolation methods can be used which should be clear to a person of ordinary skill in the art. A pixel color and pixel exposure arrangement with local symmetry, such as the pixel color and exposure arrangement in pixel array 900, clearly facilitates the interpolation of missing information. To determine an optimal overall choice for a pixel exposure set arrangement, factors to be considered include: ease of pixel layout, compatibility with readout structure of the CMOS image sensor, impact on image quality for progressive scan images, difficulty and expense of wide dynamic range image formation, interpolation method, and resolution of the wide dynamic range image.

Figure 10:
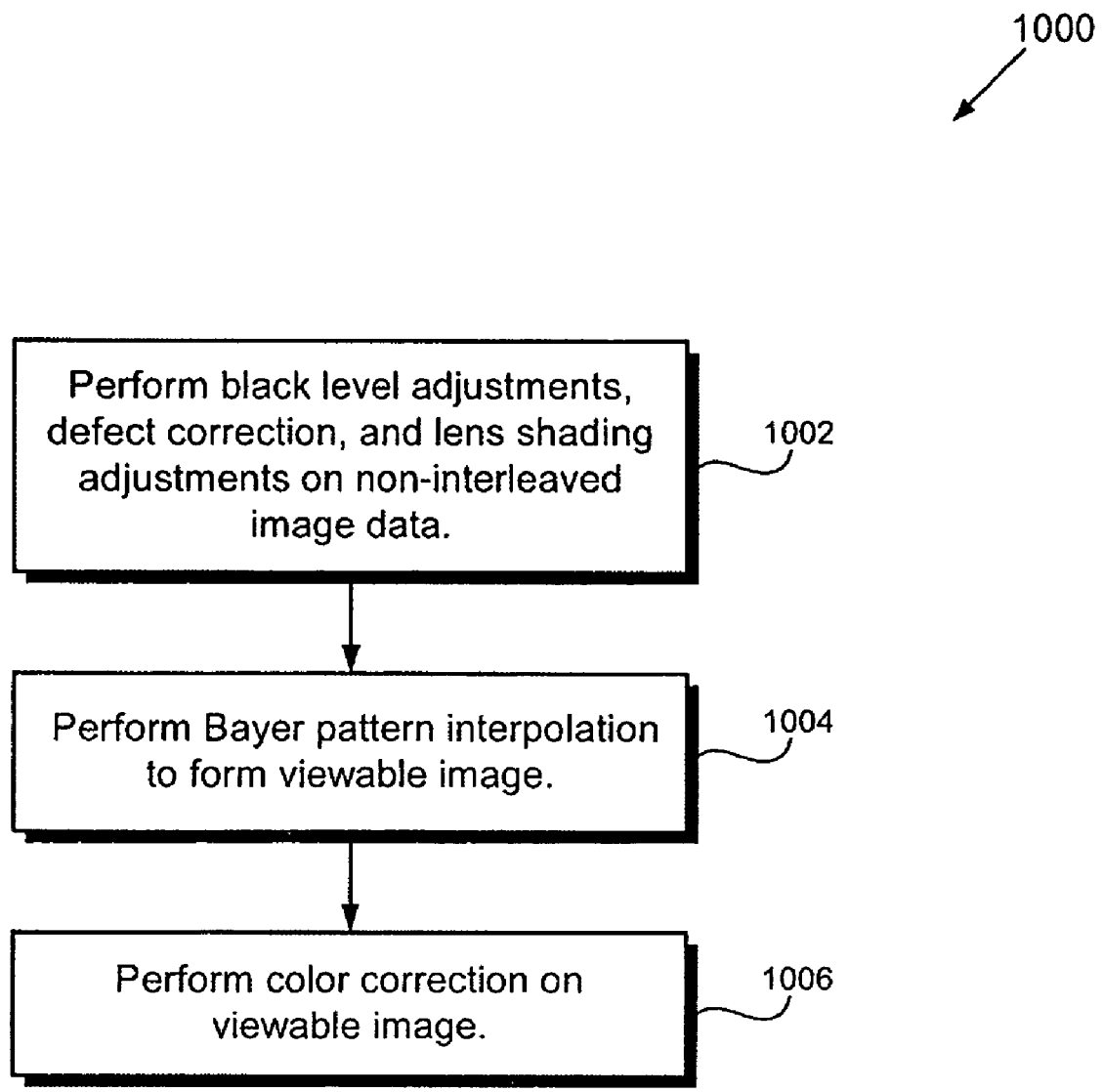
FIG. 10 illustrates a flow diagram for processing a non-interleaved image.

FIG. 10 shows exemplary flowchart 1000 depicting a method for processing a non-interleaved image. Certain details and features have been left out of flowchart 1000 of FIG. 10 that are apparent to a person of ordinary skill in the art. For example, a step may consist of one or more sub-steps or may involve specialized equipment, as known in the art. Beginning at step 1002, black level adjustments, defect correction, and lens shading adjustments are performed on non-interleaved image data. The non-interleaved image data can be generated, for example, by image sensor 102 in imager system 100 in FIG. 1 when image sensor 102 is operating in a non-interleaved mode. At step 1004, Bayer pattern interpolation is performed to form a viewable image. For example, Bayer pattern interpolation can be performed on the adjusted and corrected non-interleaved image data in non-interleaved image pipeline 112 in imager system 100 to form a viewable image, such as an RGB color image. At step 1006, color correction is performed on the viewable image. For example, color correction can be performed on the viewable image in image correction/conversion module 116 in imager system 100 in FIG. 1.

Figure 11:
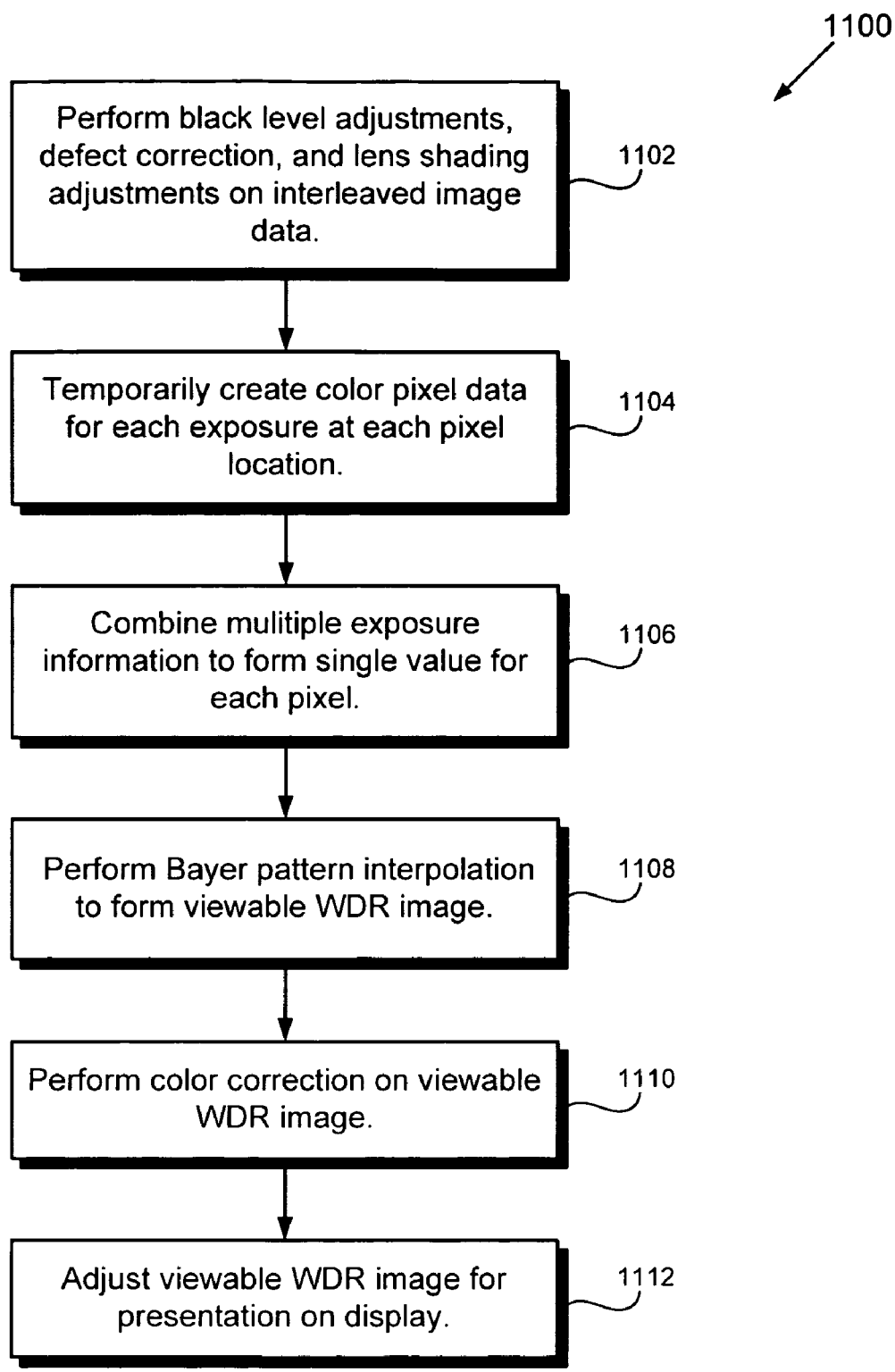
FIG. 11 illustrates a flow diagram for processing an interleaved image according to one embodiment of the present invention.

FIG. 11 shows exemplary flowchart 1100 depicting a method for processing an interleaved image according to one embodiment of the present invention. Certain details and features have been left out of flowchart 1100 of FIG. 11 that are apparent to a person of ordinary skill in the art. For example, a step may consist of one or more sub-steps or may involve specialized equipment, as known in the art. While steps 1102 through 1112 shown in flowchart 1100 are sufficient to describe one embodiment of the present invention, other embodiments of the invention may utilize steps different from those shown in flowchart 1100.

Beginning at step 1102, black level adjustments, defect correction, and lens shading adjustments are performed on interleaved image data. Step 1102 is substantially similar to step 1002 in flowchart 1000 in FIG. 10. At step 1104, color pixel data is temporarily created for each exposure at each pixel location. For example, an interpolation method can be used in interleave image pipeline 114 in imager system 100 to temporarily create color pixel data for both short and long exposures at each pixel location using two to four delay lines of memory. At step 1106, multiple exposure information is combined to form a single value for each pixel. For example, a wide dynamic range data combination algorithm can be used in interleave image pipeline 114 in imager system 100 to form a single value for each pixel from a combination of short and long exposure information. At step 1108, Bayer pattern interpolation is performed to form a viewable WDR (wide dynamic range) image. Step 1108 is substantially similar to step 1004 in flowchart 1000 in FIG. 10.

At step 1110, color correction is performed on the viewable wide dynamic range image. Step 1110 is substantially similar to step 1006 in flowchart 1000 in FIG. 10. At step 1112, the viewable wide dynamic range image is adjusted for presentation on a display. For example, the viewable wide dynamic range image can be scaled for presentation on an 8-bit display. For example, gamma correction can be performed and contrast can be adjusted on the viewable wide dynamic range image for presentation on a wide dynamic range display.

Figure 12:
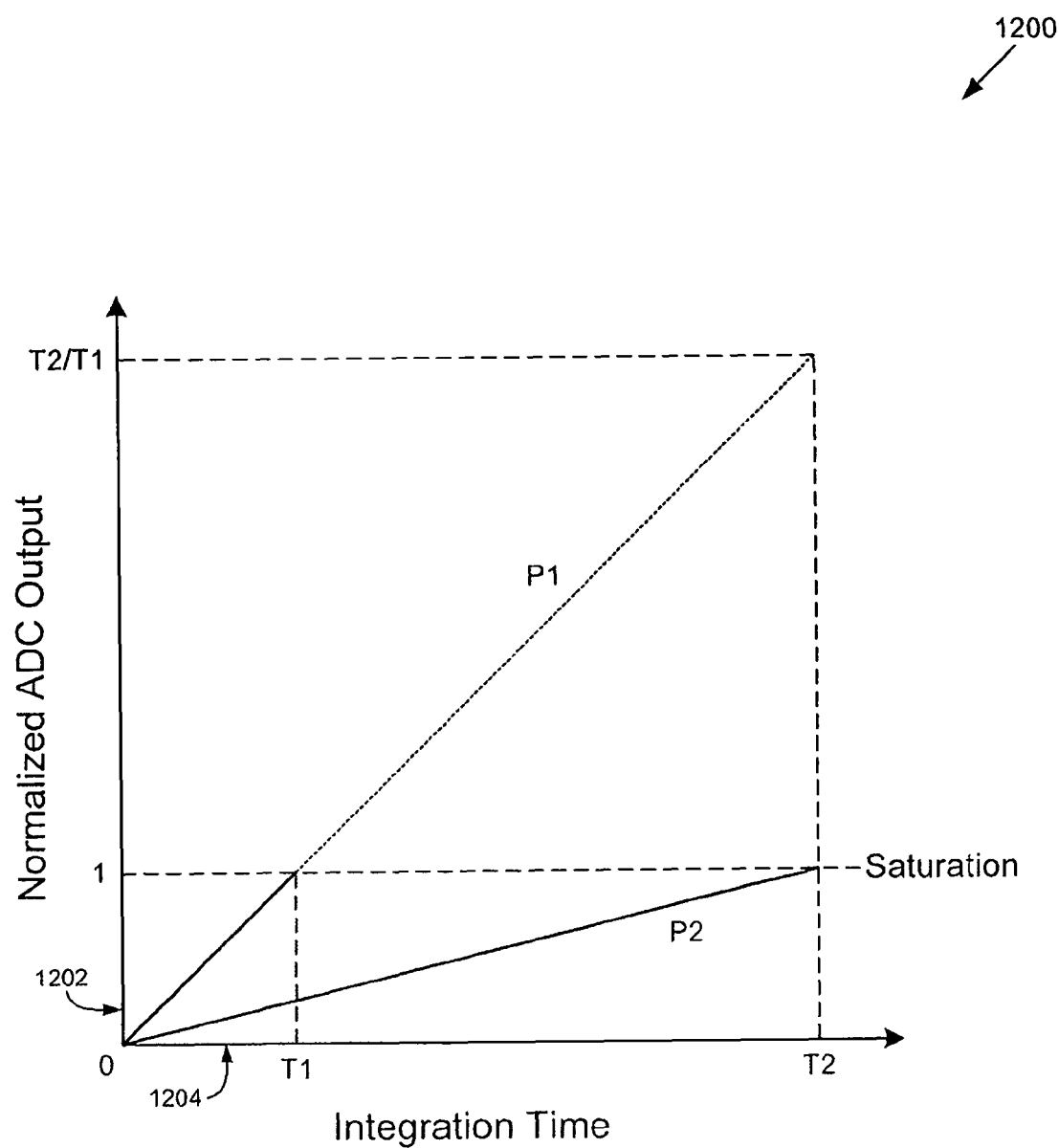
FIG. 12 illustrates a graph of a method for determining a wide dynamic range color value at each pixel location according to one embodiment of the present invention.

FIG. 12 illustrates a graph of a method for determining a wide dynamic range color value at each pixel location according to one embodiment of the present invention. In graph 1200, normalized ADC output axis 1202 corresponds to an exemplary normalized ADC output range between zero and T2/T1 and integration time axis 1204 corresponds to an exemplary integration time range between zero and T2. Graph 1200 illustrates an example algorithm to combine two exposures from a CMOS image sensor (e.g. image sensor 102 in imager system 100 in FIG. 1), which has a linear response. A weighted sum of short and long exposures is used to form a value for a wide dynamic range raw frame at each raw pixel location. In graph 1200, the short exposure has integration time T1 and the long exposure has integration time T2. Each color value in the raw frame is replaced by a wide dynamic range color value using a linear weighted sum. Data is normalized so that data in the long exposure which is at saturation is not used, as shown in the following equation:

$$CFA = CFA1 * T2/T1 * CFA2 + CFA2 * (1 - CFA2)$$

where CFA represents the value of the composite output [0 T2/T1], CFA1 represents the value of the short exposure [01], and CFA2 represents the value of the long exposure [01]. The above example algorithm for combining two exposures from a CMOS sensor can be performed at step 1106 of flowchart 1100 in FIG. 11, for example.

The invention can also be applied to black and white CMOS imagers, which do not have a color pattern, or CMOS imagers that have mixtures of black and white pixels (i.e. pixels that do not have a color filter) and pixels whose light is filtered through color filters. A black and white sensor array can also include alternate sets or arrangements of pixels for each exposure which can be reconfigured during operation by logic commands to the pixel timing circuits. For example, a progressive readout (non-interleaved readout) with a single exposure can be applied to a portion of the pixel array (e.g. a set of rows) and multiple exposures can be interleaved in another portion of the pixel array. The pattern of arrangement of the sets of pixels to receive a common exposure can also be reconfigured among alternative arrangements.

As discussed above, the invention's imager system can be fabricated on one or more semiconductor dies. In one embodiment, a CMOS imager system can be configured to have interleaved exposure capability on the same semiconductor die that includes an image pipeline and image control features to form a camera system. In one embodiment, an "interleaved image capable" CMOS image sensor can be fabricated on one semiconductor die and a second semiconductor die can include a pixel processing pipeline and image control features to form a camera system on two dies. In one embodiment, a wide dynamic range enabled CMOS image sensor can be formed on a semiconductor die that includes the essential control and pipeline functions to enable a conventional image pipeline formed on another semiconductor die to complete the necessary image processing to form a wide dynamic range image. For example, the wide dynamic range CMOS image sensor can perform steps 1102, 1104, and 1106 in flowchart 1100 in FIG. 11. At step 1106 in flowchart 1100, an image bit range compression process can be performed to match the bit depth of a conventional image pipeline.

The wide dynamic range enabled CMOS image sensor can also include control logic and image analysis logic to control selection of exposure values for sets of pixels for wide dynamic range image formation. The control logic and image analysis logic in the wide dynamic range enabled CMOS image sensor can be referred to as a "wide dynamic range converter." In this approach, companion semiconductor dies and supporting firmware and control logic do not have to be adapted to control the wide dynamic range collection process, which is advantageous. The wide dynamic range converter (i.e. the supporting logic block that enables an interleaved output from a CMOS image sensor) is substantially smaller than a full image pipeline. As a result, a wide dynamic range image can be enabled in a cost-effective manner to work with standard image pipelines in imager systems that have been optimized only for standard single exposure CMOS image sensors.

Image processing pipelines can be configured to operate on a range of bit depths. For example, low cost image pipelines can operate with 8 bits of image data input while typical consumer devices can use 10 bits of image data input. High end devices can use 12 bits or more of image data input into the image pipeline, for example. In one embodiment, a wide dynamic range converter can be programmable so as to output images having a variable bit depth that can be selected to match the particular image pipeline that is selected for the camera system. The bit depth of the image data outputted by the wide dynamic range converter can be changed by application or changed on the fly in real time, for example.

To achieve increased performance, the interleaved readout enabled CMOS image sensor and wide dynamic range pipeline can also be controlled dynamically and adapted in real time in response to conditions in a scene. In one embodiment, an imager system, such as a CMOS imager system, can be configured to collect image statistics information from exposure sets to provide a basis for optimal selection of the exposure sets for a wide dynamic range image.

Figure 13:
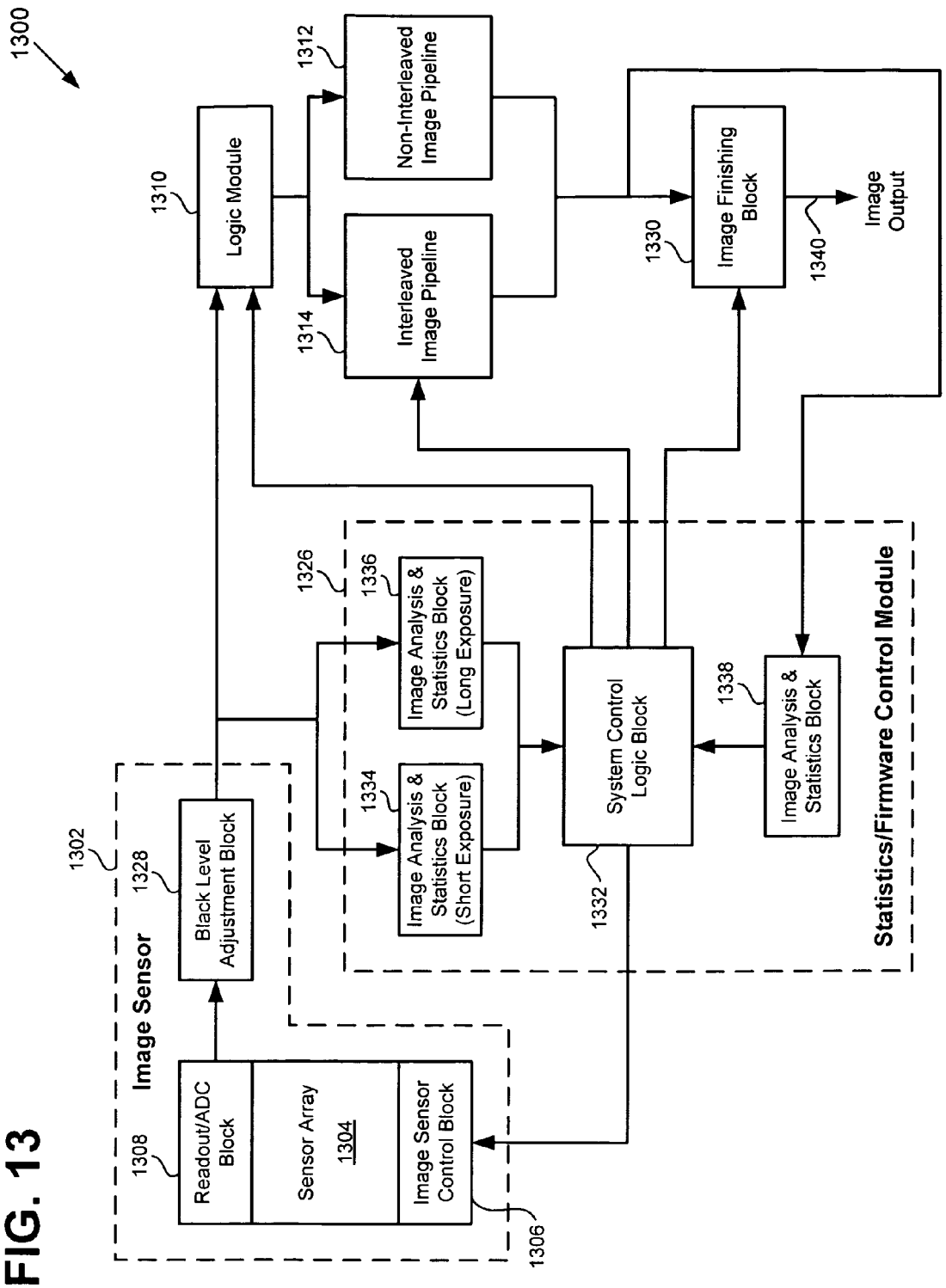
FIG. 13 illustrates a diagram of an imager system including a statistics/firmware control module in communication within the imager system according to one embodiment of the present invention.

FIG. 13 shows a diagram of an example imager system including a statistics/firmware control module in communication within the imager system, according to one embodiment of the present invention. Imager system 1300 corresponds to imager system 100 in FIG. 1. In particular, image sensor 1302, logic module 1310, non-interleaved image pipeline 1312, interleaved image pipeline 1314, and statistics/firmware control module 1326 in imager system 1300 correspond, respectively, to image sensor 102, logic module 110, non-interleaved image pipeline 112, interleaved image pipeline 114, and statistics/firmware control module 126 in imager system 100 in FIG. 1. Also, image finishing block 1330 in imager system 1300 corresponds to image correction/conversion module 116, image processing module 118, and JPEG compression module 120 in imager system 100. In addition, sensor array 1304, image sensor control block 1306, and readout/ADC block 1308 in image sensor 1032 correspond, respectively, to sensor array 104, image sensor control block 106, and readout/ADC block 108 in image sensor 102. Statistics/firmware control module 1326 includes image analysis and statistics blocks 1334, 1336, and 1338 and system control logic block 1332.

As shown in FIG. 13, image sensor 1302 includes black level adjustment block 1328, which is coupled between readout/ADC block 1308 of image sensor 1302 and logic module 1310 and image analysis and statistics blocks 1334 and 1336. Black level adjustment block 1328, which was not shown in image sensor 102 in FIG. 1, provides black level adjustments for the output of readout/ADC block 1308. Image analysis and statistics blocks 1334 and 1336 can provide information for real time or dynamic adjustments of the image formation process for short and long exposures of an interleaved image, respectively. The outputs of image analysis and statistics blocks 1334 and 1336 are coupled to an input of system control logic block 1332.

Also shown in FIG. 13, the output of non-interleaved image pipeline 1312 (e.g. a viewable image having increased dynamic range) and the output of interleaved image pipeline 1314 (e.g. a viewable image without increased dynamic range) are coupled to an input of image analysis and statistics block 1338 and the output of image analysis and statistics block 1338 is coupled to an input of system control logic block 1332. Image analysis and statistics block 1338 can provide information for determining when to advantageously form a wide dynamic range image by interleaved exposure. For example, if an optimal single exposure image still includes a significant amount of information in dark pixel values and very bright pixel values, the scene may exceed the capability of the image sensor for a single exposure. In the above example, control logic or a control program in system control logic block 1332 can perform an analysis of the camera response to the scene and cause the camera to automatically enter an interleaved mode. Further shown in FIG. 13, system control logic block 1332 is also coupled to image sensor control block 1306 in image sensor 1302, logic module 1310, interleaved image pipeline 1314, and image finishing block 1330. Image sensor 1302 can be configured to cause image sensor 1302 to output interleaved image data (i.e. to enter an interleaved mode) or to output non-interleaved image data (i.e. to enter a non-interleaved mode) by sending appropriate commands to image sensor control block 1306.

In one embodiment, when interleaved exposures are being collected, the values selected for both short and long exposures can be dynamically optimized by using image information provided by image analysis and statistics blocks 1334 and 1336, respectively. For example, the exposure of the longer exposure set(s) of pixels can be adjusted to minimize the proportion of the long exposure pixels which indicate low values to insure an acceptable representation of darker areas in the target scene. Conversely, the exposure of the shorter exposure set(s) of pixels can be adjusted to minimize the proportion of the short exposure pixels that indicate high values to insure that the shorter exposure provides an acceptable representation of the bright objects in the scene. Thus, the representation of the target scene with wide dynamic range can be optimized on the fly (i.e. dynamically) by using a short exposure control loop, which can include image analysis and statistics block 1334, system control logic block 1332 and image sensor 1302, and a long exposure control loop, which can include image analysis and statistics block 1336, system control logic block 1332 and image sensor 1302, where each control loop has a different target condition. For example, the target condition of the short exposure control loop can be to minimize the proportion of the short exposure pixels that indicate high values while the target condition of the long exposure control loop can be to minimize the proportion of the long exposure pixels that indicate low values. The short and the long exposure control loops are operate in parallel, for example.

In addition, the analysis can be performed by the short and long exposure control loops on the respective short and long exposures selected to represent the target scene. When the content of the target scene changes so as to require less separation between the short and long exposures, the decreased separation between the short and long exposures can be detected and the image sensor can be dynamically commanded to exit the interleaved mode and enter a non-interleaved mode. As a result, the resolution of the output image can be automatically optimized and a single exposure or a set of exposures with only a small differential can be used when the content of the target scene has low dynamic range. Conversely, as the separation between bright and dark content in the target scene increases, the imager system can automatically adapt the interleaved exposure set (i.e. enter the interleaved mode) for an optimal output image by using a wider separation between simultaneous exposures.

In a similar manner, an imager system having an interleaved mode of operation can support more than one possible set of exposures. For example, an image sensor can be provided with the ability to partition lines by exposure on a variable basis, which can be either spatial as regards pixel arrangement or temporal as regards the sequence of frames generated. For example, for a standard target scene, a uniform exposure (e.g. exposure "E1") can be selected as represented by the sequence:

E1   E1   E1      E1   E1   E1      E1   E1 . . .

For example, for a target scene having wide dynamic range and resolution, emphasis can be balanced between light and dark areas. Accordingly, an exposure set can be selected with an equal representation of two exposures (e.g. exposures "e1" and "E1"), as represented by the sequence:

e1   E1   e1      E1   e1   E1      e1   E1 . . .

For example, a target scene having a small region with bright content can be represented with reduced resolution to allow the darker or more prevalent image content to have increased resolution. Accordingly, an exposure set can be selected where exposure e1 is less than exposure E2 and where ¾ of the pixels receive exposure E2, as represented by the sequence:

```
e1  E2  E2  E2  e1  E2  E2  E2 . . .
```

In various embodiments, both pixel sets and assigned exposures can be changed dynamically. The dynamic changing of pixel sets can require additional control lines, which may not be suitable for very small pixels for consumer applications. However, dynamic changing of pixel sets may be suitable for machine vision or other applications that allow larger pixels, which can accommodate the required additional control lines. The advantages and ability to generate suitable alternate patterns can be greater for black and white imager systems, where the constraints of color reconstruction are not present.

In one embodiment, adjustments to a wide dynamic range exposure pattern can also be applied within a frame. For example, a portion of the frame can be outputted with an interleaved exposure and another portion of frame can be outputted with a standard single exposure. For example, the region of an image corresponding to a bright sky can receive an interleaved exposure to enable a more effective description of the bright sky.

For some applications, the pixel pattern and/or the mode of exposure can be advantageously changed from frame to frame in a dynamic manner. For example, M out of N frames can be interleaved exposure frames, which can be interposed with N-M single exposure frames. For wide dynamic range video applications, the perceived resolution can be increased by taking advantage of the persistence of human vision in a video sequence by alternating exposure assignments for interleaved pixel sets within each frame or by interleaving interleaved frames with single exposure frames.

As discussed above, by forming a viewable image by combining image data from multiple sets of pixels, where each set of pixels has a different exposure in the same frame, the present invention provides an imager system, such as a CMOS imager system, that advantageously increases the dynamic range of the viewable image. The present invention also provides an imager system that is economical, efficient, and is able to produce viewable images of substantial quality. The invention's imager system can also be operated in a conventional manner (i.e. in a non-interleaved mode) to maximize resolution by using only one exposure for all pixels under suitable lighting conditions, such as lighting conditions that are sufficiently uniform.

The present invention may be embodied in other specific forms without departing from its spirit or essential characteristics. The described embodiments are to be considered in all respects only as illustrative and not restrictive. Those skilled in the art will recognize that changes and modifications may be made to the embodiments without departing from the scope of the present invention. These and other changes or modifications are intended to be included within the scope of present invention, as broadly described herein.

What is claimed is:

1. An imager system for providing a viewable image having increased dynamic range, said imager system comprising:
an image sensor comprising a plurality of sets of pixels arranged into Bayer patterns, said image sensor configured to operate in either an interleaved mode or a non-interleaved mode, each of said plurality of sets of pixels configured to receive one of a plurality of exposures and to generate image data corresponding to said one of said plurality of exposures in said interleaved mode, wherein green pixels within each of said Bayer patterns each receive a different one of said plurality of exposures in said interleaved mode;
said each of said plurality of sets of pixels further configured to receive a same exposure and to generate image data corresponding to said same exposure in said non-interleaved mode;
wherein said image sensor is configured to output said image data generated by said each of said plurality of sets of pixels as a frame of interleaved image data in said interleaved mode, wherein said image sensor is further configured to output said image data corresponding to said same exposure as a frame of non-interleaved image data in said non-interleaved mode, and wherein said image sensor is further configured to exit said interleaved mode and enter said non-interleaved mode or to exit said non-interleaved mode and enter said interleaved mode in response to a change in a target scene;
wherein said plurality of sets of pixels comprise two sets of pixels, and wherein said two sets of pixels are interleaved in a zig-zag Bayer interleave pattern.

2. The imager system of claim 1 further comprising an interleaved image pipeline in communication with said image sensor, wherein said interleaved image pipeline is configured to receive said interleaved image data from said image sensor, combine said image data generated by said each of said plurality of sets of pixels corresponding to said one of said plurality of exposures to form said viewable image, and output said viewable image.

3. The imager system of claim 2, wherein said interleaved image pipeline is configured to receive said interleaved image data from said image sensor and combine said image data generated by said each of said plurality of sets of pixels corresponding to said one of said plurality of exposures without using a frame buffer.

4. The imager system of claim 2, wherein said interleaved image pipeline and said image sensor are situated on separate semiconductor dies.

5. The imager system of claim 2, wherein said interleaved image pipeline and said image sensor are situated on one semiconductor die.

6. The imager system of claim 2, wherein said viewable image comprises an RGB image.

7. The imager system of claim 1 further comprising a wide dynamic range converter block in communication with said image sensor.

8. The imager system of claim 7 further comprising an interleaved image pipeline in communication with said image sensor, wherein said interleaved image pipeline is configured to receive said interleaved image data from said image sensor, combine said image data generated by said each of said plurality of sets of pixels corresponding to said one of said plurality of exposures to form an intermediate image, and output said intermediate image, wherein said intermediate image is suitable for being processed into said viewable image.

9. An imager system for providing a viewable image having increased dynamic range, said imager system comprising:
an image sensor comprising a plurality of sets of pixels arranged into Bayer patterns, said image sensor configured to operate in either an interleaved mode or a non-interleaved mode, each of said plurality of sets of pixels configured to receive one of a plurality of exposures and to generate image data corresponding to said one of said plurality of exposures in said interleaved mode, wherein green pixels within each of said Bayer patterns each receive a different one of said plurality of exposures in said interleaved mode;

said each of said plurality of sets of pixels further configured to receive a same exposure and to generate image data corresponding to said same exposure in said non-interleaved mode;

wherein said image sensor is configured to output said image data generated by said each of said plurality of sets of pixels as a frame of interleaved image data in said interleaved mode, wherein said image sensor is further configured to output said image data corresponding to said same exposure as a frame of non-interleaved image data in said non-interleaved mode, and wherein said image sensor is further configured to exit said interleaved mode and enter said non-interleaved mode or to exit said non-interleaved mode and enter said interleaved mode in response to a change in a target scene;

wherein said plurality of sets of pixels comprise two sets of pixels, wherein said two sets of pixels are interleaved in a ½ line Bayer interleave pattern, and wherein green pixels in said ½ line Bayer interleave pattern alternate between a first of said plurality of exposures and a second of said plurality of exposures in every other row of said ½ line Bayer interleave pattern.

10. A method for providing a viewable image having increased dynamic range in an imager system, said method comprising:

generating image data by each of a plurality of sets of pixels corresponding to one of a plurality of exposures when an image sensor in said imager system is operating in an interleaved mode, said plurality of sets of pixels being situated in said image sensor and arranged into Bayer patterns wherein green pixels within each of said Bayer patterns each receive a different one of said plurality of exposures in said interleaved mode, said image sensor configured to operate in either said interleaved mode or a non-interleaved mode, said image sensor further configured to exit said interleaved mode and enter said non-interleaved mode or to exit said non-interleaved mode and enter said interleaved mode in response to a change in a target scene;

outputting said image data generated by said each of said plurality of sets of pixels as a frame of interleaved image data by said image sensor in said interleaved mode;

generating image data by said each of said plurality of sets of pixels corresponding to a same exposure when said image sensor is operating in said non-interleaved mode; and outputting said image data generated by said each of said plurality of sets of pixels corresponding to said same exposure as a frame of non-interleaved image data by said image sensor in said non-interleaved mode;

wherein said plurality of sets of pixels comprise two sets of pixels, and wherein said two sets of pixels are interleaved in a zig-zag Bayer interleave pattern.

11. The method of claim 10, further comprising:

receiving said interleaved image data from said image sensor by an interleaved image pipeline in said imager system;

combining by said interleaved image pipeline said image data generated by said each of said plurality of sets of pixels corresponding to said one of said plurality of exposures to form said viewable image; and outputting said viewable image by said interleaved image pipeline.

12. The method of claim 11, wherein said interleaved image pipeline receives said interleaved image data and combines said image data generated by said each of said plurality of sets of pixels corresponding to said one of said plurality of exposures to form said viewable image without using a frame buffer.

13. The method of claim 11, wherein said interleaved image pipeline and said image sensor are situated on separate semiconductor dies.

14. The method of claim 11, wherein said interleaved image pipeline and said image sensor are situated on one semiconductor die.

15. The method of claim 11, wherein said viewable image comprises an RGB image.

16. The method of claim 11, wherein said viewable image comprises a YUV image.

17. The method of claim 10, further comprising:

receiving said interleaved image data from said image sensor by an interleaved image pipeline in said imager system;

utilizing a wide dynamic range converter block to enable said interleaved image pipeline to combine said image data generated by said each of said plurality of sets of pixels corresponding to said one of said plurality of exposures to form an intermediate image; and outputting said intermediate image by said interleaved image pipeline;

wherein said intermediate image is suitable for being processed into said viewable image.

18. A method for providing a viewable image having increased dynamic range in an imager system, said method comprising:

generating image data by each of a plurality of sets of pixels corresponding to one of a plurality of exposures when an image sensor in said imager system is operating in an interleaved mode, said plurality of sets of pixels being situated in said image sensor and arranged into Bayer patterns wherein green pixels within each of said Bayer patterns each receive a different one of said plurality of exposures in said interleaved mode, said image sensor configured to operate in either said interleaved mode or a non-interleaved mode, said image sensor further configured to exit said interleaved mode and enter said non-interleaved mode or to exit said non-interleaved mode and enter said interleaved mode in response to a change in a target scene;

outputting said image data generated by said each of said plurality of sets of pixels as a frame of interleaved image data by said image sensor in said interleaved mode;

generating image data by said each of said plurality of sets of pixels corresponding to a same exposure when said image sensor is operating in said non-interleaved mode; and outputting said image data generated by said each of said plurality of sets of pixels corresponding to said same exposure as a frame of non-interleaved image data by said image sensor in said non-interleaved mode;

wherein said plurality of sets of pixels comprise two sets of pixels, wherein said two sets of pixels are interleaved in a ½ line Bayer interleave pattern, and wherein green pixels in said ½ line Bayer interleave pattern alternate between a first of said plurality of exposures and a second of said plurality of exposures in every other row of said ½ line Bayer interleave pattern.

19. A method for providing a viewable image having increased dynamic range in an imager system, said method comprising:
 generating image data by each of a plurality of sets of pixels corresponding to one of a plurality of exposures when an image sensor in said imager system is operating in an interleaved mode, said plurality of sets of pixels being situated in said image sensor and arranged into Bayer patterns wherein green pixels within each of said Bayer patterns each receive a different one of said plurality of exposures in said interleaved mode, said image sensor configured to operate in either said interleaved mode or a non-interleaved mode, said image sensor further configured to exit said interleaved mode and enter said non-interleaved mode or to exit said non-interleaved mode and enter said interleaved mode in response to a change in a target scene;
 outputting said image data generated by said each of said plurality of sets of pixels as a frame of interleaved image data by said image sensor in said interleaved mode;
 generating image data by said each of said plurality of sets of pixels corresponding to a same exposure when said image sensor is operating in said non-interleaved mode; and
 outputting said image data generated by said each of said plurality of sets of pixels corresponding to said same exposure as a frame of non-interleaved image data by said image sensor in said non-interleaved mode;
 wherein said plurality of sets of pixels comprise two sets of pixels, and wherein said two sets of pixels are interleaved and arranged in an alternating flipped pattern.

20. An imager system for providing a viewable image having increased dynamic range, said imager system comprising:
 means for sensing a target scene, said sensing means comprising a first plurality of sets of pixels arranged into first Bayer patterns, said sensing means configured to operate in either an interleaved mode or a non-interleaved mode, each of said first plurality of sets of pixels configured to receive one of a first plurality of exposures in said interleaved mode, wherein green pixels within each of said first Bayer patterns each receive a different one of said first plurality of exposures in said interleaved mode, said each of said first plurality of sets of pixels further configured to receive a same exposure and to generate image data corresponding to said same exposure in said non-interleaved mode;
 wherein said sensing means is configured to output image data generated by said each of said first plurality of sets of pixels as a frame of interleaved image data in said interleaved mode, wherein said sensing means is further configured to output said image data corresponding to said same exposure as a frame of non-interleaved image data in said non-interleaved mode, and wherein said sensing means is further configured to exit said interleaved mode and enter said non-interleaved mode or to exit said non-interleaved mode and enter said interleaved mode in response to a change in said target scene;
 wherein said first plurality of sets of pixels comprise two sets of pixels, wherein said two sets of pixels are interleaved in a ½ line Bayer interleave pattern, and wherein green pixels in said ½ line Bayer interleave pattern alternate between a first of said plurality of exposures and a second of said plurality of exposures in every other row of said ½ line Bayer interleave pattern.

21. An imager system for providing a viewable image having increased dynamic range, said imager system comprising:
 means for sensing a target scene, said sensing means comprising a first plurality of sets of pixels arranged into first Bayer patterns, said sensing means configured to operate in either an interleaved mode or a non-interleaved mode, each of said first plurality of sets of pixels configured to receive one of a first plurality of exposures in said interleaved mode, wherein green pixels within each of said first Bayer patterns each receive a different one of said first plurality of exposures in said interleaved mode, said each of said first plurality of sets of pixels further configured to receive a same exposure and to generate image data corresponding to said same exposure in said non-interleaved mode;
 wherein said sensing means is configured to output image data generated by said each of said first plurality of sets of pixels as a frame of interleaved image data in said interleaved mode, wherein said sensing means is further configured to output said image data corresponding to said same exposure as a frame of non-interleaved image data in said non-interleaved mode, and wherein said sensing means is further configured to exit said interleaved mode and enter said non-interleaved mode or to exit said non-interleaved mode and enter said interleaved mode in response to a change in said target scene;
 wherein said first plurality of sets of pixels comprise two sets of pixels, and wherein said two sets of pixels are interleaved in a zig-zag Bayer interleave pattern.

22. The imager system of claim 21 further comprising a means for forming said viewable image in communication with said sensing means, wherein said viewable image forming means is configured to receive said interleaved image data from said sensing means, combine said image data generated by said each of said first plurality of sets of pixels corresponding to said one of said first plurality of exposures to form said viewable image, and output said viewable image.

23. The imager system of claim 22, wherein said viewable image forming means is configured to receive said interleaved image data from said sensing means and combine said image data generated by said each of said first plurality of sets of pixels corresponding to said one of said first plurality of exposures without using a frame buffer.

24. The imager system of claim 22, wherein said viewable image forming means and said sensing means are situated on separate semiconductor dies.

25. The imager system of claim 22, wherein said viewable image forming means and said sensing means are situated on one semiconductor die.

26. The imager system of claim 22, wherein said viewable image comprises an RGB image.

27. The imager system of claim 22 further comprising a means for automatic exit from said interleaved mode.

28. The imager system of claim 27, wherein said means for automatic exit from said interleaved mode is provided through a means for analysis of statistics from said viewable image or from said each of said first plurality of sets of pixels.

29. The imager system of claim 27, wherein said means for automatic exit from said interleaved mode is provided through a means for analysis of statistics from said viewable image and from said each of said first plurality of sets of pixels.

30. The imager system of claim 21 further comprising a means for forming an RGB image from said non-interleaved image data in communication with said sensing means, wherein said RGB image forming means is configured to receive said non-interleaved image data from said sensing means, convert said non-interleaved image data into said RGB image, and output said RGB image.

31. The imager system of claim 30 further comprising means for automatic entry into said interleaved mode.

32. The imager system of claim 31, wherein said means for automatic entry into said interleaved mode is provided through a means for analysis of statistics from said RGB image.

33. The imager system of claim 21 further comprising a means for providing automated interleaved exposure selection.

34. The imager system of claim 33, wherein said automated interleaved exposure selection means comprises analyzing said interleaved image data to determine each of said first plurality of exposures.

35. The imager system of claim 34, wherein said first plurality of sets of pixels comprises a short exposure set of pixels and a long exposure set of pixels, wherein said automated interleaved exposure selection means comprises using a control loop having a first target condition to determine said short exposure set and a control loop having a second target condition to determine said long exposure set.

36. The imager system of claim 35, wherein said control loop having said first target condition and said control loop having said second target condition operate in parallel.

37. The imager system of claim 21, wherein said sensing means further comprises a second plurality of sets of pixels, wherein each of said second plurality of sets of pixels is configured to receive one of a second plurality of exposures in said interleaved mode, wherein said sensing means is configured to select between said first plurality of sets of pixels and said second plurality of sets of pixels on a frame-to-frame basis.

38. The imager system of claim 21, wherein said first plurality of sets of pixels comprises a first set of pixels and a second set of pixels, wherein said first set of pixels receives a first exposure and said second set of pixels receives a second exposure in a first frame of interleaved image data, wherein said first set of pixels receives said second exposure and said second set of pixels receives said first exposure in a second frame of interleaved image data.

39. The imager system of claim 21, wherein a plurality of frames of said interleaved image data are interspersed with a plurality of frames of said non-interleaved image data to generate a video sequence.

40. An imager system for providing a viewable image having increased dynamic range, said imager system comprising:
   means for sensing a target scene, said sensing means comprising a first plurality of sets of pixels arranged into first Bayer patterns, said sensing means configured to operate in either an interleaved mode or a non-interleaved mode, each of said first plurality of sets of pixels configured to receive one of a first plurality of exposures in said interleaved mode, wherein green pixels within each of said first Bayer patterns each receive a different one of said first plurality of exposures in said interleaved mode, said each of said first plurality of sets of pixels further configured to receive a same exposure and to generate image data corresponding to said same exposure in said non-interleaved mode;
   wherein said sensing means is configured to output image data generated by said each of said first plurality of sets of pixels as a frame of interleaved image data in said interleaved mode, wherein said sensing means is further configured to output said image data corresponding to said same exposure as a frame of non-interleaved image data in said non-interleaved mode, and wherein said sensing means is further configured to exit said interleaved mode and enter said non-interleaved mode or to exit said non-interleaved mode and enter said interleaved mode in response to a change in said target scene;
   means for forming said viewable image in communication with said sensing means, wherein said viewable image forming means is configured to receive said interleaved image data from said sensing means, combine said image data generated by said each of said first plurality of sets of pixels corresponding to said one of said first plurality of exposures to form said viewable image, and output said viewable image;
   wherein said sensing means further comprises a second plurality of sets of pixels arranged into second Bayer patterns, wherein each of said second plurality of sets of pixels is configured to receive one of a second plurality of exposures in said interleaved mode, wherein green pixels within each of said second Bayer patterns each receive a different one of said second plurality of exposures in said interleaved mode, wherein said sensing means is configured to select either said first plurality of sets of pixels or said second plurality of sets of pixels.

41. The imager system of claim 40, wherein said first plurality of exposures and said second plurality of exposures can be dynamically adjusted in response to said target scene to optimize resolution of said viewable image.

42. The imager system of claim 41, wherein said sensing means is configured to select either said first plurality of sets of pixels or said second plurality of sets of pixels using statistics collected from previous exposures in said interleaved mode.

43. The imager system of claim 40, wherein said sensing means is configured to select either said first plurality of sets of pixels or said second plurality of sets of pixels based on statistics collected during operation in said non-interleaved mode.

44. An imager system for providing a viewable image having increased dynamic range, said imager system comprising:
   an image sensor comprising a plurality of sets of pixels arranged into Bayer patterns, said image sensor configured to operate in either an interleaved mode or a non-interleaved mode, each of said plurality of sets of pixels configured to receive one of a plurality of exposures in said interleaved mode, wherein green pixels within each of said Bayer patterns each receive a different one of said plurality of exposures in said interleaved mode, said each of said plurality of sets of pixels further configured to receive a same exposure in said non-interleaved mode, said image sensor configured to output image data generated by said each of said plurality of sets of pixels as a frame of interleaved image data in said interleaved mode, said image sensor further configured to output image data generated by said each of said plurality of sets of pixels as a frame of non-interleaved image data in said non-interleaved mode, said image sensor further configured to exit said interleaved mode and enter said non-interleaved mode or to exit said non-interleaved mode and enter said interleaved mode in response to a change in a target scene; and
   an image pipeline in communication with said image sensor, wherein said image pipeline is configured to receive said interleaved image data from said image sensor, combine said image data generated by said each of said plurality of sets of pixels corresponding to said one of said plurality of exposures to form said viewable image without using a frame buffer, and output said viewable image;

wherein said plurality of sets of pixels comprise two sets of pixels, and wherein said two sets of pixels are interleaved in a zig-zag Bayer interleave pattern.

45. The imager system of claim 44, wherein said interleaved image data has a programmable bit depth.

46. The imager system of claim 45 further comprising a wide dynamic range converter in communication with said image sensor.

47. The imager system of claim 46; wherein said programmable bit depth is selected from the group consisting of 10 bits and 12 bits.

48. An imager system for providing a viewable image having increased dynamic range, said imager system comprising:

an image sensor comprising a plurality of sets of pixels arranged into Bayer patterns, said image sensor configured to operate in either an interleaved mode or a non-interleaved mode, each of said plurality of sets of pixels configured to receive one of a plurality of exposures in said interleaved mode, wherein green pixels within each of said Bayer patterns each receive a different one of said plurality of exposures in said interleaved mode, said each of said plurality of sets of pixels further configured to receive a same exposure in said non-interleaved mode, said image sensor configured to output image data generated by said each of said plurality of sets of pixels as a frame of interleaved image data in said interleaved mode, said image sensor further configured to output image data generated by said each of said plurality of sets of pixels as a frame of non-interleaved image data in said non-interleaved mode, said image sensor further configured to exit said interleaved mode and enter said non-interleaved mode or to exit said non-interleaved mode and enter said interleaved mode in response to a change in a target scene; and an image pipeline in communication with said image sensor, wherein said image pipeline is configured to receive said interleaved image data from said image sensor, combine said image data generated by said each of said plurality of sets of pixels corresponding to said one of said plurality of exposures to form said viewable image without using a frame buffer, and output said viewable image;

wherein said plurality of sets of pixels comprise two sets of pixels, wherein said two sets of pixels are interleaved in a ½ line Bayer interleave pattern, and wherein green pixels in said ½ line Bayer interleave pattern alternate between a first of said plurality of exposures and a second of said plurality of exposures in every other row of said ½ line Bayer interleave pattern.

49. The imager system of claim 48, wherein said interleaved image data has a programmable bit depth.

50. The imager system of claim 49 further comprising a wide dynamic range converter in communication with said image sensor.

51. The imager system of claim 50, wherein said programmable bit depth is selected from the group consisting of 10 bits and 12 bits.

* * * * *